United States Patent
Romm et al.

(10) Patent No.: US 11,550,824 B2
(45) Date of Patent: Jan. 10, 2023

(54) MULTI-LEVEL, CLUSTER-BASED OPTIMIZATION TECHNIQUES

(71) Applicant: AllianceBernstein L.P., New York, NY (US)

(72) Inventors: Gavin Romm, Chappaqua, NY (US); Regina Circosta, Manlius, NY (US); Andrea Ardemagni, New York, NY (US); Max Greenberg-Thompson, North Bergen, NJ (US); Ruokun Huang, New York, NY (US)

(73) Assignee: AllianceBernstein L.P., New York, NY (US)

( * ) Notice: Subject to any disclaimer, the term of this patent is extended or adjusted under 35 U.S.C. 154(b) by 0 days.

(21) Appl. No.: 17/460,567

(22) Filed: Aug. 30, 2021

(65) Prior Publication Data

US 2022/0067071 A1 Mar. 3, 2022

Related U.S. Application Data

(60) Provisional application No. 63/111,056, filed on Nov. 8, 2020, provisional application No. 63/072,829, filed on Aug. 31, 2020.

(51) Int. Cl.
*G06F 16/28* (2019.01)
*G06F 16/245* (2019.01)

(52) U.S. Cl.
CPC .......... *G06F 16/285* (2019.01); *G06F 16/245* (2019.01)

(58) Field of Classification Search
CPC .............................. G06F 16/285; G06F 16/245
See application file for complete search history.

(56) References Cited

U.S. PATENT DOCUMENTS

| 8,583,467 | B1* | 11/2013 | Morris | ............ G06Q 10/06316 |
| | | | | 705/7.22 |
| 2008/0243816 | A1* | 10/2008 | Chan | ..................... G06Q 30/00 |
| | | | | 707/999.005 |

(Continued)

OTHER PUBLICATIONS

Asadov H.H. et al, "New Method of Multi-Level Optimization" 2010 IEEE (Year: 2010).*

(Continued)

*Primary Examiner* — Alicia M Willoughby
(74) *Attorney, Agent, or Firm* — Kowert, Hood, Munyon, Rankin & Goetzel, P.C.; Dean M. Munyon

(57) ABSTRACT

Techniques are disclosed relating to multi-level, cluster-based optimization. In various embodiments, the disclosed techniques include performing a multi-level optimization operation to optimize the composition of a cluster of collections. For example, in various embodiments, the disclosed techniques include iteratively filtering a (typically large) set of available items down into progressively smaller subsets, from which items may be selected to modify the composition of the collections in a cluster of related collections. In some embodiments, the disclosed techniques include performing multi-level optimization operation that includes a collection-level optimization calculation for individual collections in the cluster, and, after filtering the set of available items based on the collection-level optimization calculations, performing a cluster-level optimization calculation. Based on this cluster-level optimization calculation, the disclosed techniques may determine a set of modifications to perform to optimize the composition of the collections in the cluster.

20 Claims, 8 Drawing Sheets

(56) References Cited

U.S. PATENT DOCUMENTS

2018/0225709 A1* 8/2018 Ferber ................ G06Q 30/0272
2020/0184278 A1* 6/2020 Zadeh ................ G06K 9/6264
2021/0117998 A1* 4/2021 Cho ...................... G06N 7/005

OTHER PUBLICATIONS

Boyd et al., "Convex Optimization," Cambridge University Press 2004; entire document.
Supply Chain Optimization Problem with CVXPY and CBC; https://stackoverflow.com/questions/66027371/supply-chain-optimization-problem-with-cvxpy-and-cbc; 2 pages [Retrieved Aug. 30, 2021].

* cited by examiner

MULTI-LEVEL, CLUSTER-BASED OPTIMIZATION TECHNIQUES

CROSS-REFERENCE TO RELATED APPLICATIONS

This application claims benefit of priority to U.S. Provisional Patent Application Ser. No. 63/072,829, filed on Aug. 31, 2020 and to U.S. Provisional Patent Application Ser. No. 63/111,056, filed on Nov. 8, 2020, both of which are hereby incorporated by reference as if entirely set forth herein.

BACKGROUND

Technical Field

This disclosure relates generally to applications in mathematical optimization, and more particularly to multi-level, cluster-based optimization techniques.

Description of the Related Art

Optimization is a branch of applied mathematics that relates to identifying an "optimal" solution from a set of possible solutions. Solving an optimization problem often includes iteratively evaluating permissible input values using an objective function, where the solution to the optimization problem is, in many implementations, the input value that maximizes (or minimizes, depending on the implementation) the objective function while satisfying one or more relevant constraints. Solving optimization problems present various technical challenges, however. For example, optimization problems can be incredibly computationally complex, requiring a significant amount of time (e.g., hours, days, etc.) and resources to solve. This computational complexity is compounded as the number of permissible input values increases.

DETAILED DESCRIPTION

Figure 1:
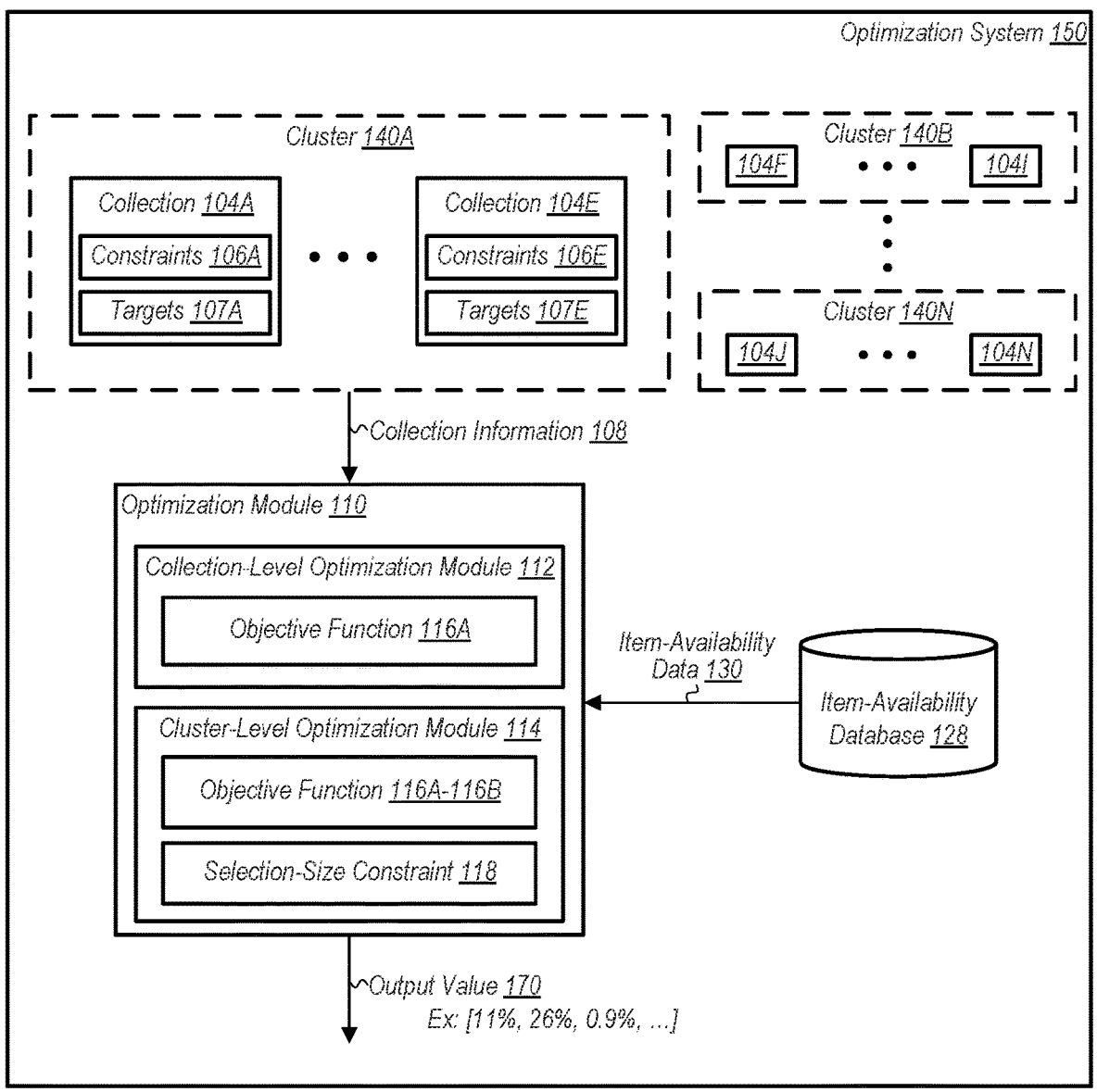
FIG. 1 is a block diagram illustrating an example optimization system, according to some embodiments.

Optimization is a branch of applied mathematics concerned with the selection of an "optimal" solution, from a set of possible solutions, as measured based on an objective function. In many instances, solving an optimization problem involves minimizing or maximizing an objective function, possibly under various constraints. Minimizing or maximizing the objective function is often performed by iteratively selecting input values, from a set of permitted input values, and computing the value of the objective function, where the output value from this objective function corresponds to the cost (when minimizing) or benefit (when maximizing) provided by the set of input values selected during a given iteration. An optimization model typically requires (1) the specification of a quantitative objective function to assess the benefit provided by a given selection of input values, which is to be maximized (or, alternatively, a criterion of cost, which is to be minimized), and (2) the specification of constraints, representing, for example, the physical limits of the decision actions, limits on resources, design requirements to be met, etc. An "optimal" design is one that gives the best possible objective value while satisfying all problem constraints. Many real-world decision problems and engineering design problems can, in principle, be expressed mathematically in the form of an optimization problem, though, in practice, merely having a problem expressed as an optimization model does not guarantee that the problem can then be solved.

One particular subfield of mathematical optimization is convex optimization, which involves minimization or maximization of a convex objective function. As will be appreciated by one of skill in the art with the benefit of this disclosure, a convex function is one for which a line segment between two points on the graph of the function lies above the graph between the two points. Applications of convex optimization arise in various disciplines, such as electronic circuit design, control systems, communication networks, and many others. Formulating an optimization problem as a convex optimization problem may provide various technical benefits, including saving time and computational resources in determining a solution to the convex optimization problem (when compared to other classes of optimization problems). Non-convex optimization problems, by contrast, are typically much more difficult to solve, requiring more time and computational resources to determine a solution. The difficulty of non-convex optimization problems typically increase with the degree of the "non-convexity" of the problem such that each new non-convex constraint in the problem causes an increase in the complexity of the problem.

This disclosure relates generally to multi-level, cluster-based optimization techniques that, in various embodiments, optimize the composition of items included in a group of "collections" of items. More particularly, in various embodiments, the disclosed techniques are usable to optimize the composition of items chosen, for a group of related collections, from a (potentially very large) set of available items. For example, in various embodiments the disclosed techniques include identifying, from multiple (and, possibly, many) different collections, a first group (also referred to herein as a "cluster") of similar collections based, for example, on those collections' constraints, targets, or other characteristics. Then, in various embodiments, the disclosed techniques perform a series of operations to filter the set of available items down into progressively smaller subsets of items, from which items may be selected to modify the composition of the collections (either through addition to or removal from the individual collections) in the first cluster.

For example, in various embodiments the disclosed techniques first include filtering the set of available items down into a first subset of items based on one or more constraints associated with the collections in the first cluster. Performing a constraint-based filtering operation early in the optimization operation may provide various technical benefits. For instance, as described in detail herein, various embodiments of the disclosed optimization techniques include performing collection-level and cluster-level optimization calculations, which may be computationally expensive. As will be appreciated by one of skill in the art with the benefit of this disclosure, the computational complexity of, and time required to solve, these optimization calculations may increase as the number of items under consideration increases. Performing a constraint-based filtering operation, however, is relatively computationally inexpensive. Accordingly, by removing one or more (and, possibly, many) items from consideration based on the constraints of the collections included in the cluster enables such embodiments to significantly reduce the number of items left for consideration in the subsequent optimization calculations, thereby reducing the time and computational cost associated with performing these calculations.

Further, in various embodiments, the disclosed techniques include filtering the first subset of items into a second, smaller subset of items based on one or more performance metrics associated with the first subset of items. Like the constraint-based filtering operation, performing the performance metric-based filtering operation before the subsequent optimization calculations may provide various technical advantages, including reducing the number of items left for consideration during the subsequent optimization calculations and, accordingly, reducing the time and computational expense required to perform these calculations. That is, in various embodiments, the constraint-based filtering and the performance metric-based filtering provide technical benefits by removing those items that would be unsuitable for further consideration based on the collections' constraints or the items' performance, which, in turn, simplifies the subsequent optimization calculations performed to determine the manner in which to ultimately modify the composition of the collections in the first cluster.

Additionally, note that, in many instances, there may be a "selection-size" constraint (also referred to herein as a "block size" constraint) that limits the number of items that can be added to or removed from a collection to a particular integer number (or multiples thereof) of a given type of item. That is, there are many instances in which items cannot be partially added or removed from a collection and, instead, items must be either added or removed from a collection in blocks of a particular size (e.g., 1, 10, 250, 5000, etc.). When taken into consideration in the above-described context of optimizing the composition of items included in a collection, these selection-size constraints cause the optimization problem to become non-convex, which, in turn, significantly increases the time and computational resources required to determine a solution (if a solution can be determined at all). As the number of available items and number of collections to optimize increases, the computational complexity of this non-convex optimization problem also increases such that it is often impossible to determine a viable solution within the relevant time constraints (e.g., hours, days, etc.).

In various embodiments, however, the disclosed techniques are capable of solving this optimization problem in a fast and computationally efficient manner so as to optimize the composition of the items included in a cluster of collections. For example, as described in detail below, in various embodiments the disclosed techniques include performing multiple optimization calculations, including collection-level optimization calculations and cluster-level optimization calculations. For example, some such embodiments include performing a collection-level optimization calculation for each of the collections in the first cluster, for example by maximizing an objective function for the individual collections. As described in detail below, in various embodiments the collection-level optimization calculation attempts to identify a reduced number (e.g., 100, 500, 1,000, etc.) of (potentially different) items, from the second subset of items, for each of the collections in the first cluster. In various embodiments, the items identified, for a given collection, using the collection-level optimization calculation indicates those items that could potentially be selected for the given collection, were that collection being optimized in isolation. In this process, the items identified for one of the collections ("Collection A") may or may not overlap with the items identified for another one of the collections ("Collection B") in the first cluster. In many instances, after completing the collection-level optimization calculation, there may be some (and possibly many) items that were not selected for any of the collections in the first cluster. Accordingly, in various embodiments, the collection-level optimization calculation may be used to further filter the items remaining for consideration from the second subset of items to a smaller subset of items. Note that, in various embodiments, the collection-level optimization calculations do not take into consideration the selection-size constraints mentioned above and, as such, involve solving a convex optimization problem (as described in more detail below with reference to FIGS. 6A-6B).

The disclosed techniques, in various embodiments, then include performing one or more cluster-level optimization calculations to determine the modifications to make to the composition of the collections in the first cluster. For example, in various embodiments, the disclosed techniques include performing a first cluster-level optimization calculation that also does not take into consideration the selection-size constraints so as to reduce the number of remaining items available for selection and then, using this reduced selection set, performing a second cluster-level optimization calculation that does take the selection-size constraints into consideration. In various embodiments, the disclosed techniques use these cluster-level optimization calculations to generate an output value (e.g., as a vector or other suitable data structure) that indicates the modifications to be made to the collections in the first cluster. For example, in some embodiments, the output value is a vector for which the indices of the vector correspond to a given type of the remaining items, and the data value (e.g., a percentage, an integer, a floating-point value, etc.) at a given index indicates the amount of that particular type of item to add or remove for a given collection so as to optimize the composition of the items included in the first cluster of collections. Based on this output value, various embodiments include making these identified modifications to the collections so as to optimize the composition of the collections in the first cluster. These operations may be repeated to optimize the composition of collections included in one or more other clusters, as desired.

Note that, in various embodiments, the first cluster-level optimization calculation involves solving a convex optimization problem since the selection-size constraints are not taken into consideration at this point, allowing the disclosed techniques to further reduce the number of remaining items using fast and computationally efficient techniques. While the second cluster-level optimization calculation, in various embodiments, involves solving a non-convex optimization problem (due to the inclusion of selection-size constraints and a selection-penalty term), since the size of this problem has been significantly reduced through a series of filters and convex optimization problems, this second cluster-level optimization calculation may be performed in a fast (e.g., seconds, minutes, etc.) and computationally efficient manner, allowing a solution to the overall optimization problem to be determined such that the composition of the collections can be optimized within the relevant time constraints.

Referring now to FIG. 1, block diagram 100 depicts an example optimization system 150, according to some embodiments. In the depicted embodiment, optimization system 150 includes an optimization module 110 that may be used to optimize the composition of the collections 104 included in one or more clusters 140, according to some embodiments. Note that, in various embodiments, optimization system 150 may be used in any of various situations in which a subset of items 160 (e.g., 10, 50, 100, etc.) are to be selected, for one or more collections 104, from a (potentially) much larger universe of available items 160 (e.g., 50,000, 100,000, 500,000, 1,000,000, etc.) in a fast and computationally efficient manner that optimizes the composition of those collections 104 based on various constraints 106 and targets 107.

In FIG. 1, optimization system 150 includes item-availability database 128 that includes item-availability data 130 corresponding to a set of items 160 that are currently available for selection. As noted above, in some embodiments there may be a large number of different types of items 160 that are available for selection and inclusion in one or more of the collections 104. Consider, as one non-limiting example, a scenario in which there are a large number (e.g., hundreds of thousands, millions, etc.) of unique types of items 160A-160N, each of which has its own attributes that may make it desirable for inclusion in a given collection 104. Further, assume that, in at least some such embodiments, there are a large number of a given type of item 160 that may be selected for inclusion in a single collection 104 or in multiple different collections 104. As a non-limiting example, consider an instance in which there are one million different types of items 160 and, for a particular type of item 160A, there are 100,000 instances of that item 160A that are available for selection and inclusion in one or more of the collections 104. Additionally, in some such embodiments, one or more of the collections may already include (e.g., as part of their respective holdings 105, not separately shown in FIG. 1) one or more instances of a particular type of item 160 that may, or may not, still be available for selection. As will be appreciated by one of skill in the art with the benefit of this disclosure, using prior, manual techniques to optimize the composition of a given collection 104, provided the large number of available items 160 and the constraints 106 and targets 107 for the given collection 104, is an extremely complicated and time-intensive task. This technical problem is compounded when there are a large number (e.g., hundreds, thousands, etc.) of collections 104 to optimize and when considerations, such as the selection-size constraints discussed above, convert the problem into a non-convex problem.

In various embodiments, the disclosed techniques include grouping the collections 104 into clusters 140 of similar collections. In the depicted embodiment, for example, cluster 140A includes collections 104A-104E, cluster 140B includes collections 104F-104I, and cluster 140N includes collections 104J-104N. Various non-limiting embodiments of the disclosed clustering techniques are described in detail below with reference to FIG. 4. For the purposes of the present discussion, however, note that the collections 104 may be grouped into any suitable number of clusters 140, each of which may include any suitable number of collections 104. Note that, in various embodiments, a collection 104 is associated with a user 102 (not separately shown, for clarity). Further, in some embodiments, a particular user may be associated with multiple different collections 104. As a non-limiting example, in one embodiment collection 104A, in cluster 140A, and collection 104F, in cluster 140B, may both be associated with the same user 102A. Note that, in various embodiments, the disclosed techniques group the collections 104 into clusters 140 to be optimized together to further reduce the size and computational complexity of the optimization problem being solved. By grouping collections 104 into clusters 140, the disclosed techniques break the larger optimization problem—optimizing the composition of many (e.g., thousands, tens of thousands, etc.) collections 104—into a series of smaller, more computationally manageable problems.

In various embodiments, the disclosed techniques include optimizing the composition of the collections 104 in two "phases"—an "item-removal" phase (in which the optimization system 150 determines items 160 to remove from the collections 104 in a cluster 140), and an "item-addition" phase (in which the optimization system determines the items 160 to add to the collections 104 in a cluster 140). That is, in some embodiments, it may be desirable to optimize the composition of the collections 104 in multiple different rounds—one round that removes items 160 from the collections 104 and another round that adds items 160 to the collections 104. This approach may provide various technical benefits. For example, in various embodiments, it may be desirable to optimize the composition of the collections 104 in different clusters 140 during these two phases. For instance, as described in greater detail below, there may be advantages (such as reduced "modification penalties") associated with removing larger blocks of a particular type of item from the collections 104 and, as such, various disclosed embodiments include grouping those collections 104 (e.g., using k-means clustering) that have similar holdings such that larger blocks of items 160, aggregated across the collections 104 in a cluster 140, can be removed, thereby reducing the associated modification penalty. Further, in various embodiments, it may be advantageous to group collections 104 that, based on their respective needs and targets 107, are likely to add the same types of items 160 to their collections 104 during the item addition phase, for example so items 160 can be selected in larger block sizes (reducing the associated modification penalty).

As a non-limiting example, assume that in the embodiment of FIG. 1, the collections 104A-104N are those collections 104 (e.g., from a larger set of collections 104A-104Z) for which items 160 need to be removed (e.g., so that other, more-suitable items 160 may later be added). In this example, the optimization system 150 may determine the clusters 140 shown in FIG. 1 such that the disclosed optimization techniques may be used to determine those items 160 to remove from the collections 104A-104N during an item-removal phase. Once this phase has been completed and the determined modifications have been completed (e.g., the identified types and quantities of items 160 have been removed from the corresponding collections 104), another clustering operation may be performed so as to group the collections into clusters 140 to be optimized together during an item-addition phase. Note that, in various embodiments, the collections 104 in a cluster 140 may vary between the item-removal and item-addition phases. That is, there may or may not be overlap between collections 104 in a cluster 140 during these two phases such that a given collection 104 may be in a different cluster 140 when being optimized during an item-removal phase than when being optimized during an item-addition phase.

Optimization system 150 of FIG. 1 further includes optimization module 110, which, in various embodiments, is operable to perform a multi-level optimization operation to optimize the composition of (that is, the number and types of items 160 included in) the collections 104. In the embodiment depicted in FIG. 1, optimization module 110 includes collection-level optimization module 112 and cluster-level optimization module 114.

In various embodiments, the optimization module 110 may receive as input various items of collection information 108 relating to the collections 104. In the depicted embodiment, for example, the collections 104 may have holdings 105 of existing items 160 that have previously been selected (using the disclosed techniques or otherwise selected) for the respective collections 104, constraints 106, and targets 107. In various embodiments, the collection information 108 may be stored in one or more storage devices (not separately shown, for clarity) included in or accessible to the optimization module 110 or the optimization system 150. For example, in one embodiment, the collection information may be stored in a database that contains profiles for users 102 or collections 104 along with a set of corresponding targets 107 and constraints 106. Users 102 may have a profile containing information specific to them, which, in some embodiments, forms the basis for the optimization process performed by optimization module 110. For example, in various embodiments, the optimization module 110 ingests existing holdings 105, constraints 106, targets 107, a user profile, and item-availability data 130.

Constraints 106 may include any of various suitable limitations or conditions (selected, for example, by a user 102 associated with a collection 104) on the particular types of items 160 that may be included in a particular collection 104. In various embodiments, the constraints 106 for a given collection 104 may vary to reflect user attributes and preferences. For example, a user 102A may opt to have most or all items 160 in their collection 104A from a particular subset of types of items 160C-160L, or may opt to exclude one or more types of items 160A and 160C from their collection 104A. The wide array of constraints supported by the disclosed optimization system 150 is purposeful, allowing customization at scale across many diverse types of users 102 with varied preferences on the structure of their respective collections 104. Note that constraints 106 may include any suitable number of constraints (e.g., 20-30 constraints), such as selection restrictions (e.g., on the number or particular types of items 160, etc.). Targets 107 may include any of various suitable goals or objectives (selected, for example, by a user 102 associated with a collection 104) sought to be achieved through the composition of a particular collection 104. In some embodiments, for example, one or more of the targets 107 may correspond to performance-based metrics associated with the particular types of items 160 to be included in a collection 104, or any other suitable attribute of the particular types of items 160, the user 102, or for the collection 104 as a whole.

As noted above, the disclosed optimization module 110 may be used, in various embodiments, to optimize clusters 140 of collections 104 together as a group. In various embodiments, information associated with the collections 104 in a given cluster 140 is prepared as input into the optimization module 110, which is operable to generate an output value 170 specifying the modifications to be made for the collections 104 in the cluster 140. For example, as noted above, in various embodiments the optimization module 110 filters the set of available items 160 down into progressively smaller subsets before determining the modifications to be made for the collections 104 in the cluster 140 based on one or more optimization calculations. In FIG. 1, optimization module 110 includes collection-level optimization module 112, which, in various embodiments, is operable to perform a collection-level optimization calculation, using an objective function 116A, for individual collections 104 in a cluster 140. For example, while optimizing cluster 140A, the collection-level optimization module 112 may perform a collection-level optimization calculation for each of the collections 104A-104E to identify a reduced subset of items 160 that could, potentially, be selected for the respective collections 104A-104E. As described in more detail below, in various embodiments the collection-level optimization module 112 is operable to perform this cluster-level optimization calculation multiple times for each of the collections 104 in a cluster 140 so that, for each collection 104, multiple ranked lists of candidate items 160 may be identified for potential addition to or removal from the collections 104.

Further, in FIG. 1, optimization module 110 includes cluster-level optimization module 114, which, in various embodiments, is operable to perform one or more cluster-level optimization calculations, using the objective functions 116A-116B, for a cluster 140 of collections 104. For example, while optimizing cluster 140A, the cluster-level optimization module 114 may perform a cluster-level optimization calculation to identify, from the reduced subset of remaining items 160, the type and amount of particular types of items 160 to add to or remove from the collections 104A-104E in the cluster 140A. As indicated in FIG. 1, in various embodiments one or more of the cluster-level optimization calculations may incorporate selection-size constraints 118, which may limit the optimization system 150's ability to select items 160 to particular block sizes. For example, as noted above, there are some embodiments in which particular types of items 160 have a selection-size constraint 118 providing that the items 160 of that particular type must be added to, or removed from, a collection 104 (or cluster 140 of collections 104) in specified block sizes (e.g., in blocks of 5,000 items 160). Based on this cluster-level optimization calculation, the optimization module 110 may generate the output value 170, which may be used to modify the composition of the collections 104A-104E in cluster 140A. Various non-limiting embodiments of this multi-level optimization operation are described in more detail below with reference to FIGS. 3 and 6A-6B.

There are a number of instances in which a collection 104 may run through the optimization module 110. For example, when a collection 104 is initially created, the optimization module 110 may be used to select an initial set of items 160 that are appropriate for the collection 104 based on the corresponding constraints 106 in addition to ensuring the collection 104 achieves a construction that satisfies the targets 107. Further, in some embodiments, the optimization module 110 may be used after a collection 104 already includes a number of items 160 in order to rebalance the composition of the collection 104 to meet the targets 107 and satisfy the constraints 106.

Figure 2:
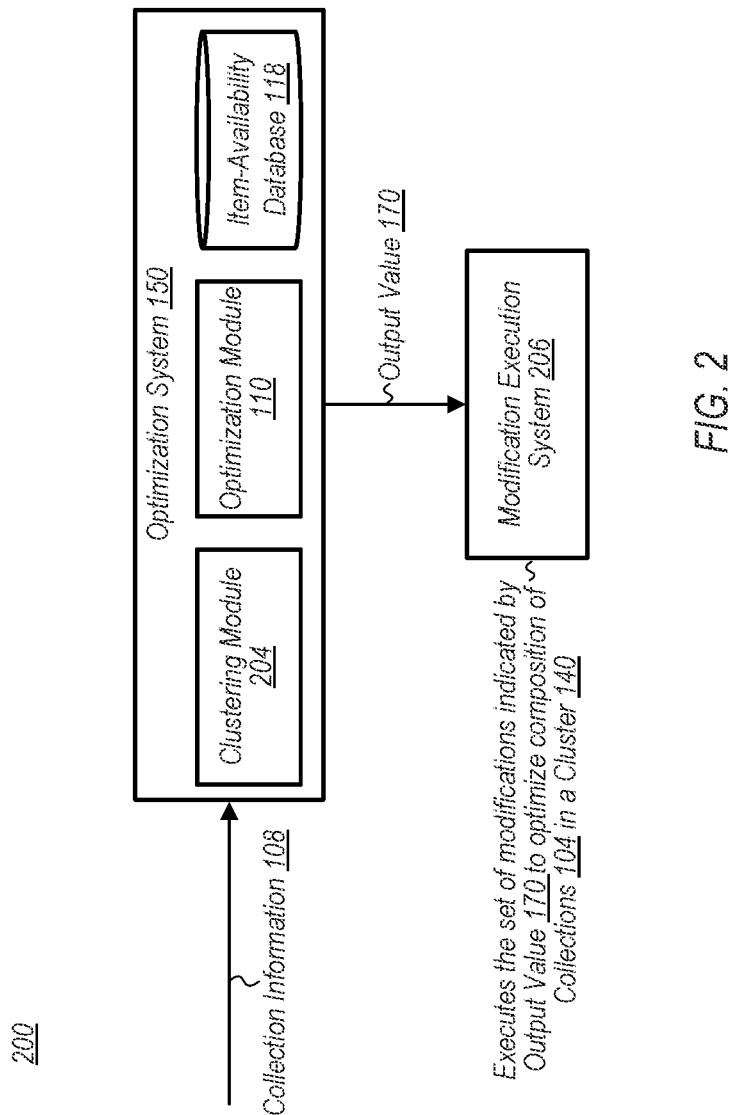
FIG. 2 is a block diagram illustrating an example optimization system and an example modification execution system, according to some embodiments.
Figure 4:
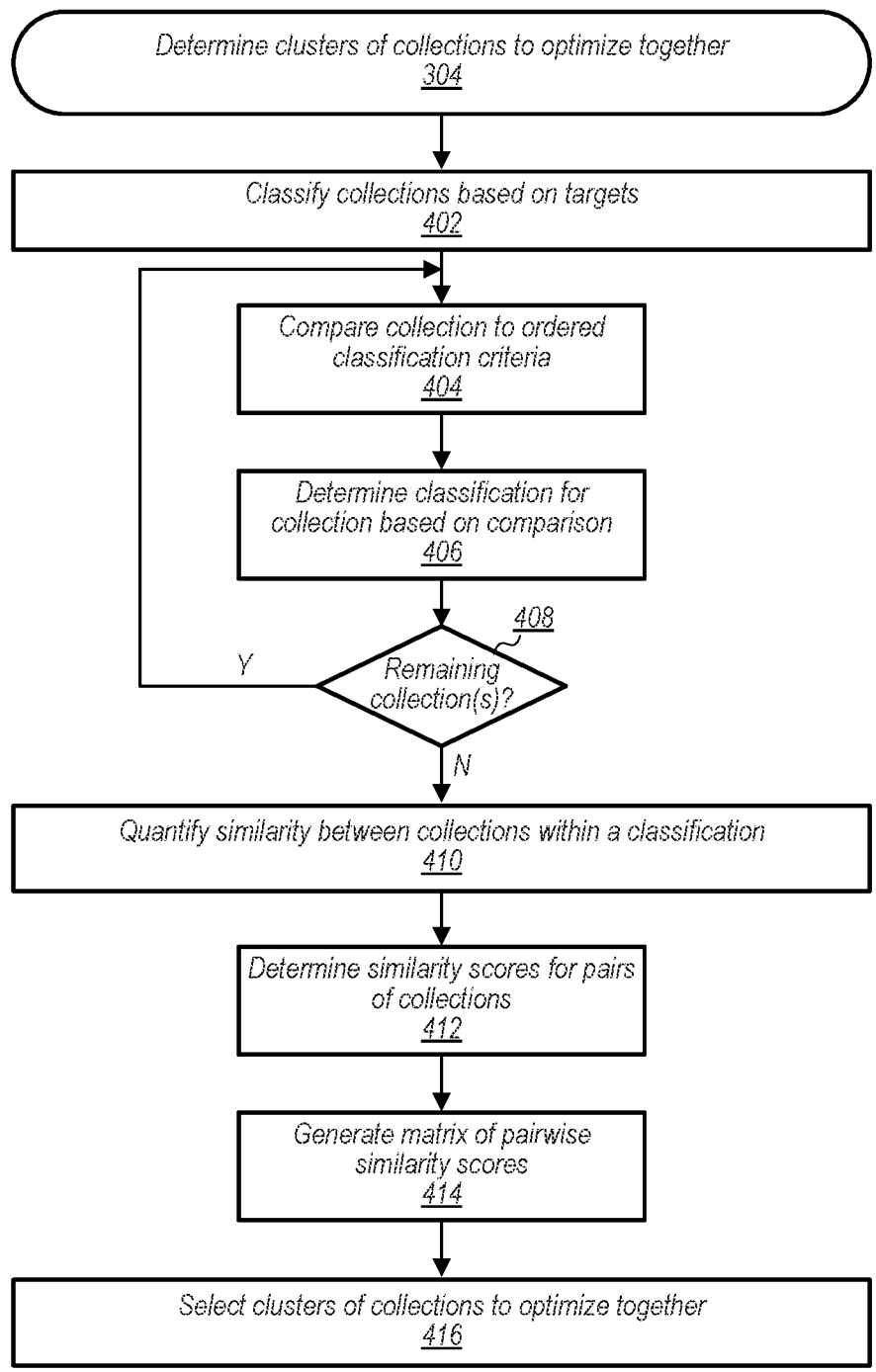
FIG. 4 is a flow diagram illustrating an example method for identifying a cluster of collections to optimize together, according to some embodiments.

In FIG. 2, block diagram 200 depicts an optimization system 150 and a modification execution system 206, according to some embodiments. In various embodiments, the modification execution system 206 is operable to execute the set of modifications indicated by output value 170 to optimize the composition of the collections 104 in a cluster 140. For example, if the output value 170 indicates that, for a cluster 140A, 10,000 of a first type of item 160A are to be added (collectively) and 5,000 of a second type of item 160B are to be added (collectively) to the collections 104A-104E, modification execution system 206, in various embodiments, is operable to make these identified modifications so as to optimize the composition of the collections 104 in the cluster 140A. In FIG. 2, optimization system 150 further includes clustering module 204, which, as described in detail below with reference to FIG. 4, is operable to identify clusters 140 of similar collections 104 to optimize together as a group.

In various embodiments, the optimization system 150 depicted in FIG. 2 may provide various improvements over prior optimization techniques. For example, consider a hypothetical optimization engine that does not incorporate availability data at the outset, instead proposing a modification to a collection 104 first and then determining whether that modification is feasible given the current item availability. Such an approach presents various technical shortcomings. For example, in this example, the proposed modification may not be possible due to current item availability (which may be particularly common in implementations in which the item market is thin or fragmented), meaning that the time and computational resources spent to determine the proposed modification(s) to the one or more collections 104 was wasted. In various embodiments, however the disclosed multi-level optimization techniques include retrieving (e.g., from item-availability database 128) availability data 130 corresponding to the items 160 that are currently available for selection and performing the disclosed optimization calculations (as described in more detail below with reference to FIGS. 6A-6B) based on this availability data 130, ensuring that the determined collections modifications may actually be performed.

Figure 3:
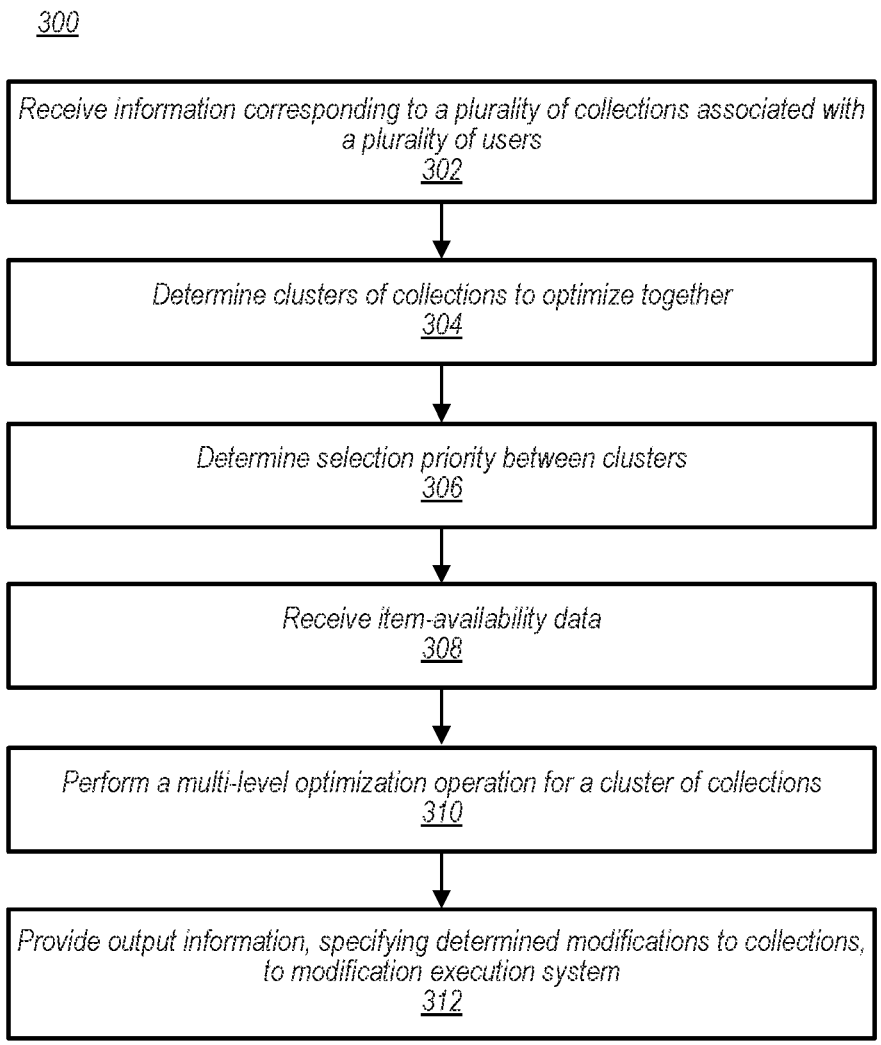
FIG. 3 is a flow diagram illustrating an example method for optimizing the composition of a cluster of collections, according to some embodiments.

Referring now to FIG. 3, a flow diagram illustrating an example method 300 is depicted, according to some embodiments. In various embodiments, method 300 may be performed by optimization system 150 of FIG. 1 to optimize the composition of a cluster 140 of collections 104. For example, optimization system 150 may include (or have access to) a non-transitory, computer-readable medium having program instructions stored thereon that are executable by the optimization system 150 to cause the operations described with reference to FIG. 3. In FIG. 3, method 300 includes elements 302-312. While these elements are shown in a particular order for ease of understanding, other orders may be used. In various embodiments, some of the method elements may be performed concurrently, in a different order than shown, or may be omitted. Additional method elements may also be performed as desired.

At 302, in the illustrated embodiments, the optimization system 150 receives collection information 108 corresponding to a plurality of collections 104. For example, as described above with reference to FIG. 1, a user 102 may be associated with one or more collection 104, each of which may have existing holdings 105, constraints 106, and targets 107. Consider, as one non-limiting example, user 102A who has a collection 104A with holdings 105A, constraints 106A, and targets 107A. As will be appreciated by one of skill in the art with the benefit of this disclosure, the nature of the items 160 included in the holdings 105, as well as the constraints 106 and targets 107, will vary according to various embodiments. For example, in some embodiments, the types of constraints 106 and targets 107 established for a collection 104 may depend on the nature of the items 160 that are included in the collections 104.

At 304, in the illustrated embodiment, the optimization system 150 (and, more specifically, the clustering module 204) determines clusters 140 of collections 104 to optimize together. The clustering operation performed by the optimization system 150 at element 304, according to some embodiments, is described in detail below with reference to FIG. 4. For the purposes of the present discussion, however, note that, in some embodiments, the clustering module 204 may use a clustering algorithm (e.g., k-means clustering) to identify collections 104 with similar targets 107 and overlaps in holdings 105. For example, in various embodiments, at element 304, clustering module 204 clusters collections 104 to be optimized based on overlaps in holdings 105 and overlaps in targets 107 between the collections 104. These collections 104 are identified and clustered to be optimized together, according to various embodiments. As described above, in various embodiments the collections 104 are clustered differently depending on whether the optimization to be performed is to determine items 160 to remove from the collections 104 or to determine items 160 to add to the collections 104. By first grouping the collections 104 into clusters 140 that have similar starting points (e.g., holdings 105) and needs (e.g., targets 107), various disclosed embodiments allow collections 104 to be fed into the optimization module 110 and achieve a higher likelihood of modifying the composition of the collections 104 in a particular cluster 140 together.

Optimizing the composition of a cluster 140 of collections 104 may provide various technical advantages over optimizing the composition of a single collection 104 individually. For example, as noted above, in some embodiments there may be selection-size constraints 118 associated with one or more of the different types of items 160, requiring that items 160 of a particular type be added to, or removed from, one or more collections 104 in specified block sizes. In some such embodiments, these block sizes may be so large relative to the size of a collection 104 that, effectively, that particular type of item 160 cannot be selected for that collection 104 because of these selection-size constraints 118, regardless of how desirable that particular type of item 160 may otherwise be for that collection 104. In various embodiments, however, by optimizing the composition of the collections 104 in a cluster 140, the disclosed techniques leverage the collective power of the group to select larger numbers of different types of items 160 to be added to, or removed from, the cluster 140, where those modifications can be distributed across the individual collections 104. Consider, as a non-limiting example, an embodiment in which a selection-size requirement 118A for a first type of item 160A dictates that the item 160A may only be obtained in a block size of 5,000 instances or units of item 160A. In many cases, it may be unlikely or uncommon that adding 5,000 instances of item 160A to a single collection 104A is optimal for the composition of that collection 104A. It may, however, be the case that it would be beneficial to the composition of the collection 104A to add a smaller number of the first type of item 160A. Using prior techniques, it would not be possible to add the first type of item 160A to the collection 104A. In various embodiments, however, the disclosed techniques may be used to leverage the aggregated size of the collections 104 in a cluster 140 to select a larger quantity of a particular type of item 160 (e.g., item 160A, in the current example) and to apportion instances (or units) of that particular type of item 160 across the various collections 104 in the cluster 140, thus expanding universe of types of items 160 that may be included in a given collection 104.

Optimizing clusters 140 of collections 104 together may provide other technical benefits as well. For example, in many contexts, there may be a penalty associated with modifying the number of a particular type of item 160 included in a collection. In some embodiments, however, optimizing the composition of collections 104 in a group (e.g., a cluster 140) allows larger blocks of items 160 to be selected, and as the number of a particular type of item 160 increases across the collections 104 in a cluster 140, the penalty associated with modifying the item 160 may decrease, reducing the penalty for the collections 104 in the cluster 140. Additionally, performing the disclosed optimization operations on a cluster 140 of collections 104, rather than all of the available collections 104 at the same time, may reduce the complexity of the computation required to perform the disclosed optimization process and, accordingly, improving the speed with which the composition of the collections 104 may be optimized. For example, in some embodiments, the biggest gains in reducing modification penalties may come from simultaneously optimizing across all collections 104 that are to be optimized. Such an approach presents various technical challenges, however, as performing this optimization calculation would be incredibly computationally expensive. Instead, in some embodiments, the disclosed technique of breaking the set of collections 104 to be optimized into clusters 140 of similar collections 104 significantly reduces the computational cost of optimizing the composition of the collections 104 while still reducing the above-described modification penalties provided by optimizing multiple collections 104 together.

At 306, in the illustrated embodiment, the optimization module 110 determines selection priority between clusters 140 to determine the order in which items 160 are to be selected for the various clusters 140. For example, although there is often initially a large number of available items 160, that number is still finite. In various embodiments, the clusters 140 may be optimized sequentially (e.g., optimizing the composition of the collections 104 in one cluster 140 before optimizing the composition of the collections 104 in another cluster 140). Accordingly, in various embodiments, it may be advantageous to specify prioritizations for the clusters 140 to allow a fair allocation process when determining which collections 104 gets the most attractive items 160. Note that, in embodiments in which only a single cluster 140 is being optimized at a given time, method 300 may omit element 306. In embodiments in which multiple clusters 140 are to be optimized sequentially, however, it may be advantageous to perform element 306 so as to optimize the manner in which the items 160 are allocated between the clusters 140. In some such embodiments, element 306 includes determining the selection priority by taking into consideration, at least, the following three metrics: the need-based classification the cluster 140 is in, the size of a given cluster 140's available items 160 and the overlap between other clusters 140, and where a cluster 140 ranks within their need-based classification.

In some embodiments, the clusters 140 are prioritized based on one or more corresponding classifications. For example, in some embodiments the disclosed techniques include determining different need-based classifications for the various clusters 140, as described in more detail below with reference to FIG. 4. As such, in some such embodiments, the disclosed techniques include determining which classification should get first pick of items 160, which may depend on the respective constraints 106 or targets 107 for the collections 104 in the clusters 140. For example, it may be desirable to prioritize a cluster 140 for which a large number of items 160 are to be added to the collections 104 therein over a cluster 140 for which the corresponding collections 104 need few additional items 160.

In various embodiments, the items 160 available for selection for a cluster 140 (also referred to herein as the cluster 140's "selection set") is dependent on the constraints 106 that the collections 104 in that cluster 140 have in common. For example, for a cluster 140 of collections 104 that, based on their constraints 106, cannot select a particular type of items 160, the disclosed optimization techniques may remove all of that particular type of item 160 from possible selection for the collections 104 in that cluster 140. In some embodiments, if there are two clusters 140A and 140B, and cluster 140A's selection set is contained by, but not the same as, the cluster 140B's selection set, the disclosed techniques may prioritize cluster 140A. If instead the clusters 140A and 140B are equal, however, prioritization may instead be dependent on their need within the classification. Further, if the selection set for the two clusters 140 are disjoint (e.g., there are not overlapping types of items 160 in their selection sets), the disclosed techniques may allocate items 160 to each cluster 140 simultaneously. Next, in various embodiments, the disclosed techniques may prioritize within each need-based classification depending on the need of that classification. For example, for clusters 140 that need to add items to their collections 104, the disclosed techniques may prioritize the cluster 140 with the greatest such need.

At 308, in the illustrated embodiment, the optimization system 150 receives item availability data. For example, in some embodiments the optimization system 150 may retrieve item-availability data 130 from the item-availability database 128. In various embodiments, the item-availability database 128 may provide real-time availability information, which may provide various technical benefits. For example, the item-availability database 128, in various embodiments, aggregates availability information across a fragmented market from many different sources. Identifying availability information in this digitized format allows it to be fed into the optimization module 110 as an eligible set of available items 160 to be selected for the various collections 104 to cure breaches to one or more constraints 106 and to achieve various targets 107. Additionally, the disclosed optimization process, in various embodiments, curates the selection set of available items 160 based on the collections 104 being analyzed, as described in detail below with reference to FIGS. 6A-6B. This too provides various technical benefits as the optimization module 110 needs a specified list of items 160 from which to select, and including a curated list based on the disclosed filtering algorithm enhances the quality of the optimization results.

At 310, in the illustrated embodiment, the optimization system 150 performs a multi-level optimization operation for a cluster 140 of collections 104. Various non-limiting embodiments of this optimization operation are described in detail below with reference to FIGS. 6A-6B. For the purposes of the present discussion, note that, in various embodiments, optimization module 110 filters the set of available items 160 based on both the constraints 106 of the collections 104 in the cluster 140 and performance-based metrics for the items 160. In various embodiments, the use of performance-based metrics leverages a "scoring methodology" that incorporates one or more quantitative metrics. For example, in some embodiments, the disclosed optimization techniques take into consideration one or more performance-based metrics (e.g., using a quantitative model) in addition to modification penalties (described above) for adding or removing a particular type of item 160 from one or more of the collections 104 in the cluster 140.

At 312, in the illustrated embodiment, optimization system 150 provides output information, specifying the modifications to make to the collections 104 in the cluster 140 being optimized, to the modification execution system 206. For example, the optimization system 150 may send the output value 170 (or information based on output value 170) to the modification execution system 206, which may execute the determined modifications so as to optimize the composition of the collections 104 in the cluster 140.

In various embodiments, the disclosed techniques provide various improvements over prior optimization techniques. For example, in some embodiments, the disclosed techniques include the systematic integration of real-time item-availability data 130, a novel approach of grouping collections 104 into clusters 140, and the incorporation of a modification penalty term into an objective function utilized during the multi-level optimization operation, which allows optimization of multiple (e.g., thousands) of unique collections 104 while benefitting from efficiencies provided by adding and removing items 160 from the collections 104 at scale as a cluster 140.

Referring now to FIG. 4, a flow diagram of method 400 depicts a non-limiting implementation of the clustering operation described above with reference to element 304 of FIG. 3. In various embodiments, method 400 may be performed by clustering module 204 of FIG. 2 to identify one or more clusters 140 of collections 104 to optimize together. For example, optimization system 150 may include (or have access to) a non-transitory, computer-readable medium having program instructions stored thereon that are executable to cause the operations described with reference to FIG. 4. In FIG. 4, method 400 includes elements 402-416. While these elements are shown in a particular order for ease of understanding, other orders may be used. In various embodiments, some of the method elements may be performed concurrently, in a different order than shown, or may be omitted. Additional method elements may also be performed as desired.

As noted above, in various embodiments clustering module 204 may cluster the collections 104 differently depending on whether items 160 are to be added to (e.g., during an item-addition phase) or removed from (e.g., during an item-removal phase) the collections 104. In various embodiments, the method 400 of FIG. 4 may be performed to determine the clusters 140 of collections 104 for an item-removal phase and then, optionally, be repeated to determine the (potentially different) clusters 140 of collections for an item-addition phase.

At 402, in the illustrated embodiment, the clustering module 204 classifies collections 104 based on their targets 107. In the depicted embodiment, element 402 includes sub-elements 404-408. For example, in some embodiments method 400 may include repeating the sub-elements 404-408 for multiple iterations so as to classify each of a set of collections 104A-104N based on their respective targets 107. At 404, the clustering module 204 compares the targets 107 of the collection 104 to ordered classification criteria and, based on that comparison, determines a classification for the collection 104 at element 406. As a non-limiting example, in some instances, one classification of collections 104 may need to remove items 160 from their respective collections 104 while another classification of collections 104 may need to shift from holding one type of item 160A to another, different type of item 160B that has different attributes. Further, in some embodiments, one or more collections 104 may fall under two classifications (e.g., a collection 104A may need to remove items 160 from its holdings 105A and shift between from one type of item 160 to another). Accordingly, in some such embodiments, the clustering module 204 uses a "waterfall" methodology in which a given collection 104 is tested against an ordered list of classifications, and whichever classification criteria the collection 104 meets first is the classification to which it is assigned. Note that, in some embodiments, two collections 104 with distinct classifications cannot belong in the same cluster 140.

At 408, in the illustrated embodiment, the clustering module 204 determines whether there are any remaining collections 104 to be classified. If so, method 400 returns to element 404. If, however, there are no remaining collections 104 to classify, method 400 then proceeds to element 410, in which the clustering module 204 quantifies the similarity between collections 104 within a classification. For example, in some embodiments, the clustering module 204 uses a scoring methodology to evaluate the likeness between every pair combination of collections 104 within a classification. In the depicted embodiment, element 410 includes sub-elements 412-414. At 412, in the illustrated embodiment, the clustering module 204 determines similarity scores for pairs of collections 104. In various embodiments, one benefit of grouping collections 104 into clusters 140 is to reduce the modification penalty associated with modifying a number of a particular type of item 160 included in a collection 104. Accordingly, in some embodiments, the clustering module 204, at element 412, determines a similarity score for the pairs of collections 104 based on one or more of the following factors: the amount of common holdings 105 in the two collections 104 (which may help ensure that there is sufficient overlap between the two collections 104 to reduce the modification penalties), the size of the common holding in each given collection 104 (which may address the situation in which two collections 104 already include a large number of the same type of item 160 such that there may not be significant benefit of those collections 104 being paired together), and the size difference between the common holding of the two collections 104 (which may account for the added benefit of being included in a cluster 140 with a collection 104 that has different holding sizes). At 414, in the illustrated embodiment, the clustering module 204 generates a matrix of pairwise similarity scores using the similarity scores generated at element 412.

In the depicted embodiment, once the clustering module 204 has generated the matrix of pairwise similarity scores at 414, method 400 proceeds to 416, at which the clustering module 204 selects the clusters 140 of collections 104 to optimize together. For example, in some embodiments, the clustering module 204 applies an iterative approach to a k-means clustering algorithm to determine which collections 104 belong in a cluster 140. Applicant notes that, in some embodiments, utilizing an iterative approach to this algorithm is advantageous due to the lack of a constraint on the maximum size of each cluster 140. In some embodiments, however the clustering module 204 may impose a limit to the number of collections 104 due to computational limitations of the optimization algorithm itself. The number of collections 104 included in a given cluster 140 may vary, according to various embodiments. As non-limiting examples, a given cluster 140 may have 10, 20, 50, 100, etc., collections 104. Applicant notes that, in many instances, the more collections 104 that are optimized together, the greater the combined selection power of the cluster 140. For example, when a greater number of collections 104 are optimized together, these collections 104 may have access to type of items 160 that would not be available to individual collections 104 or smaller clusters 140 due, as described above, to minimum selection-size constraints 118, according to some embodiments. Applicant further notes, however, that such benefits achieved by optimizing more collections 104 together causes the computational complexity involved in the optimization process to be significantly higher as the number of collections 104 in a cluster 140 increases. To address this technical problem, the disclosed systems and methods use various novel techniques to reduce the computational complexity at various points in the optimization process as described in more detail below with reference to FIG. 6A-6B, enabling the disclosed techniques to optimize clusters 140 of collections 104 in a fast and computationally efficient manner.

Figure 5:
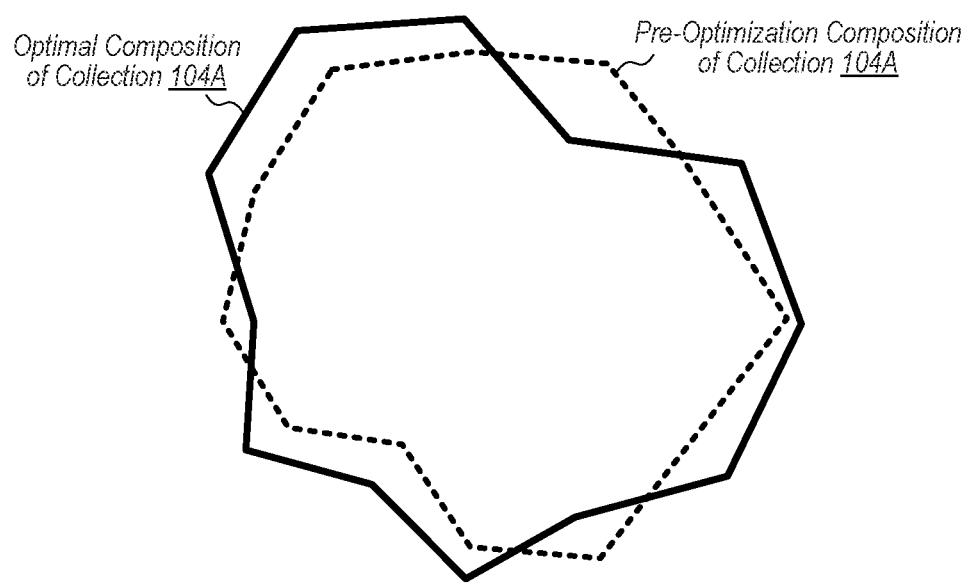
FIG. 5 is a block diagram illustrating a graphical representation of the composition of an example collection before and after optimization, according to some embodiments.

Turning now to FIG. 5, block diagram 500 provides a two-dimensional representation of the composition of a particular collection 104A both before and after the disclosed multi-level optimization techniques have been used to optimize the composition of the collection 104A, according to one non-limiting embodiment. That is, in FIG. 5, block diagram 500 includes two shapes (e.g., polygons), the sizes and shapes of which reflect, generally, the composition (that is, the number and type of items 160 included in) an example collection 104A both before and after the disclosed optimization techniques. In various embodiments, the disclosed techniques may be used to modify the type of items 160, and the number of each type of item 160, included in a collection 104 to satisfy the constraints 106 and targets 107 set out by the user 102 with which the collection 104 is associated. Thus, the diagram shown in FIG. 5 is intended to demonstrate that the disclosed optimization system 150, in various embodiments, is operable to steer the composition of a collection 104A based on that collection 104A's constraints 106A and targets 107A.

Figure 6A:
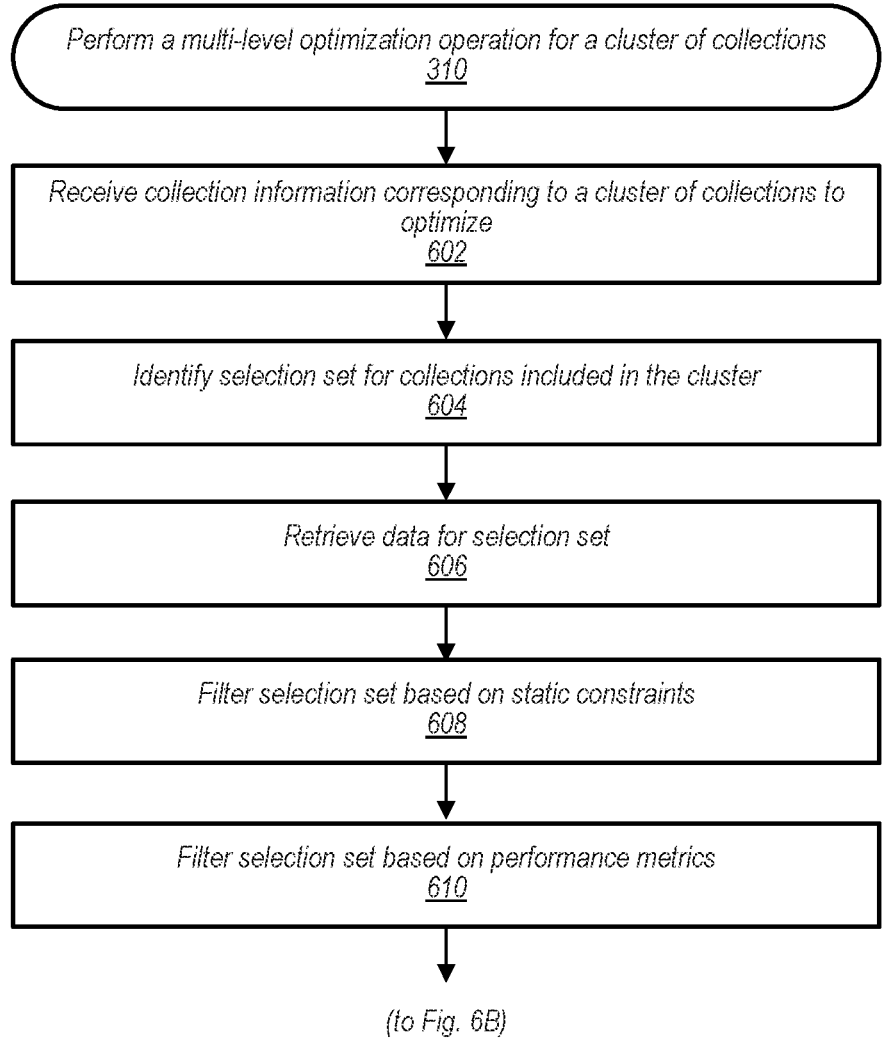
FIGS. 6A-6B are flow diagrams of an example optimization method that may be used optimizing a cluster of collections, according to some embodiments.
Figure 6B:
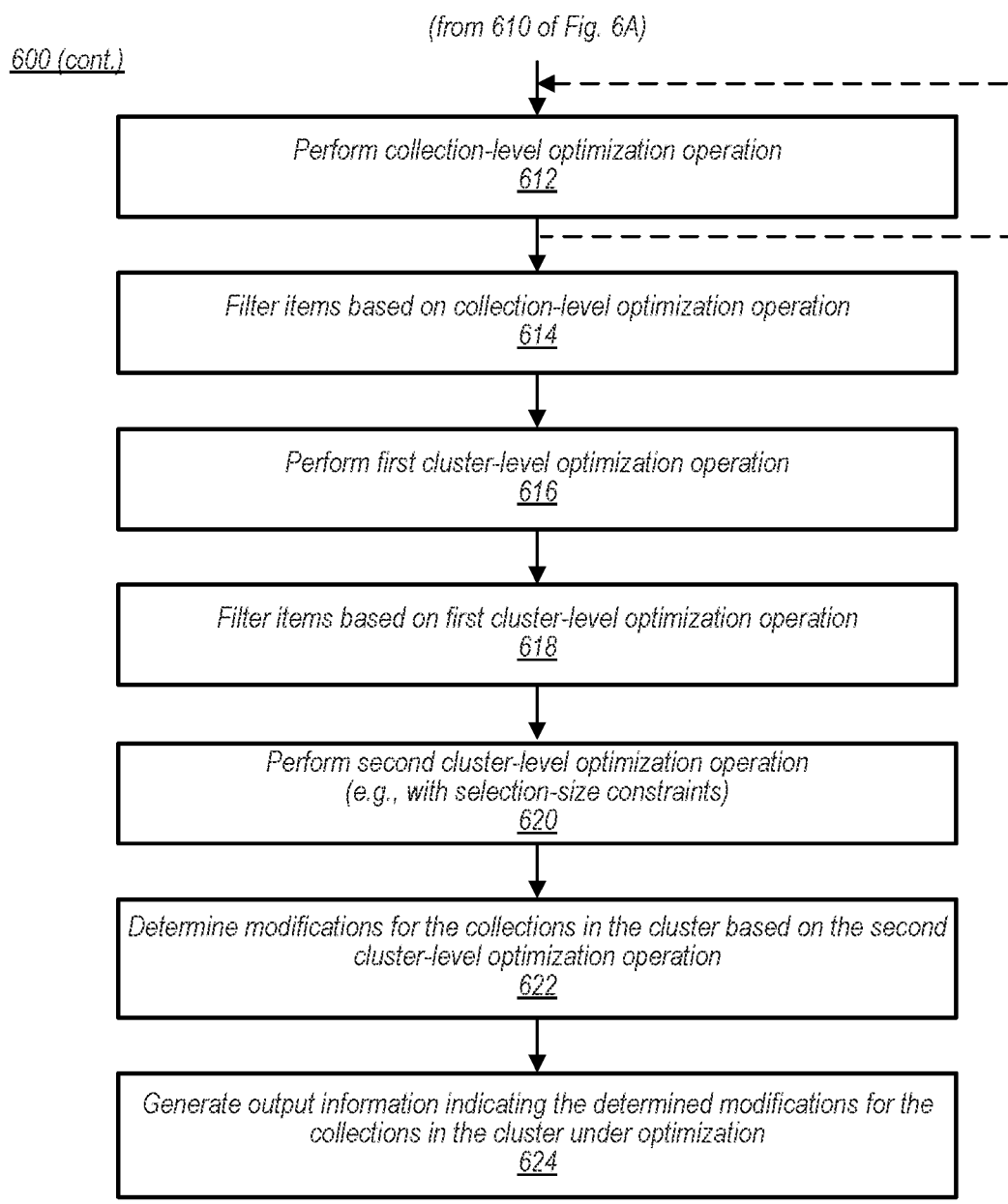

Referring now to FIGS. 6A-6B, a flow diagram illustrating an example method 600 for optimizing a cluster of collections is depicted, according to some embodiments. For example, method 600 may provide one non-limiting implementation of the optimization operations described above with reference to element 310 of FIG. 3. In various embodiments, method 600 may be performed by optimization module 110 of FIG. 1 to optimize the composition of one or more collections 104 in a cluster 140. For example, optimization system 150 may include (or have access to) a non-transitory, computer-readable medium having program instructions stored thereon that are executable by the optimization system 150 to cause the operations described with reference to FIGS. 6A-6B. In FIGS. 6A-6B, method 600 includes elements 602-624. While these elements are shown in a particular order for ease of understanding, other orders may be used. In various embodiments, some of the method elements may be performed concurrently, in a different order than shown, or may be omitted. Additional method elements may also be performed as desired.

At 602, in the illustrated embodiment, the optimization module 110 receives collection information corresponding to a cluster 140 of collections 104 to optimize. For example, in some embodiments, the clustering module 204 of the optimization system 150 may provide a list of similar collections 104 (e.g., collections 104 that are similar in size and in composition) to optimize together as a group. In some instances, this cluster 140 may be relatively small (e.g., two collections 104, five collections 104, ten collections 104, etc.). In other instances, however, the cluster 140 of collections 104 to optimize may be relatively large (e.g., 25, 50, 100 collections 104, etc.). Further note that, in some instances, the optimization module 110 may optimize a single collection 104, for example in instances in which the size of the collection 104 to be optimized has sufficient holdings 105 such that it can take advantage of large-scale selections without relying on other collections 104. In various embodiments, in addition to receiving the list of similar collections 104 to optimize as a group, the optimization module 110 may receive various items of information about each collection 104, as described above. Thus, in various embodiments, at element 602, the optimization module 110 receives information identifying a cluster 140 of collections 104 to optimize and information about the individual collections 104 in that cluster 140.

At 604, in the illustrated embodiment, the optimization module 110 identifies the selection set for all of the collections 104 included in the cluster 140 under optimization. For example, in various embodiments, the optimization module 110 identifies those types of items 160 that could potentially be selected for the collections 104 in the cluster 140 being optimized based, for instance, on the types of collections 104 in the cluster 140, common constraints associated with some or all of the collections 104 in the cluster 140, common goals or targets of the collections 104 in the cluster 140, etc.

At 606, in the illustrated embodiment, the optimization module 110 retrieves data for the items 160 in the selection set. For example, in some embodiments, the optimization module 110 may use identification numbers associated with the different types of items 160 in the selection set to pull data for the respective items 160 from the item-availability database 128. In various embodiments, the data retrieved by the optimization module 110 at element 606 may include descriptive information about each of the different types of items 160 in the selection set.

In various embodiments, the disclosed optimization module 110 is operable to filter the items 160 based both on static constraints (e.g., constraints associated with the collections 104 in the cluster 140 being optimized) and based on performance metrics associated with the available items 160, enabling the optimization module 110 to select items 160 that both fit the constraints 106 of the collections 104 being optimized and that satisfy performance-related criteria. In the depicted embodiment, the optimization module 110 performs this two-step filtering at elements 608-610.

At 608, in the illustrated embodiment, the optimization module 110 filters the items 160 based on one or more constraints 106 associated with the individual collections 104 in the cluster 140. For example, optimization module 110 may filter the selection set down to items 160 that would be appropriate to select for a given collection 104 in the cluster 140 given the collection 104's constraints 106, filtering from the selection set those items that violate the given collection 104's constraints 106 and, as such, should not be selected. Stated differently, at element 608, the optimization module 110 first filters out items 160, from the selection set, that don't match the constraints 106 of the individual collections 104 in the cluster 140 being optimized because such items 160 would be inappropriate to select for the collections 104, regardless of the performance metrics associated with these items 160.

Filtering the items 160 based on the constraints 106 of the collections 104 in the cluster 140 at element 608 may provide various technical benefits. For example, consider a hypothetical system that uses the approach of identifying items 160 that are quantitatively attractive first and then filtering out those items 160 that do not meet the applicable constraints. Such an approach presents various technical drawbacks, as it may be both time consuming and computationally expensive to quantitatively evaluate the items 160. For example, using such an approach, it may take hours or days to perform the calculations necessary to identify suitable items 160 to recommend to optimize a collection 104, during which time the identified items 160 may become unavailable. In various embodiments, however, the disclosed multi-level optimization process depicted in FIGS. 6A-6B addresses these technical drawbacks by filtering the selection set based on static constraints 106 prior to analyzing the performance-based metrics of the items 160. By filtering first based on the static constraints 106, the optimization module 110 reduces the size of the selection set significantly prior to calculating the performance-based metrics, saving both time and computational resources (e.g., cloud computing resources) while determining actionable modifications that may be made to the composition of the collections 104 in the cluster 140.

Note that, in various embodiments, the disclosed techniques may further utilize "minimum size" constraints to filter, from further considerations, those types of items 160 for which there are not a sufficient number (e.g., below the minimum size constraint) outstanding to be added to a collection 104. That is, in some embodiments, it may be desirable to filter out those types of items 160 that there aren't enough of to satisfy this minimum selection-size constraint (e.g., based on the total size of a given collection 104). For example, assume that in some embodiments, there is a minimum size constraint that restricts the optimization system 150 from adding, to a given collection 104, a number of a particular type of item 160 that is less than 1% of the collection 104's total size. In this non-limiting example, if the total number of a particular type of item 160D only amounts to 0.5% of the total size of collection 104A's total size, then the optimization module 110 may exclude item 160D from further consideration for collection 104A.

At 610, in the illustrated embodiment, the optimization module 110 filters the selection set based on performance metrics. For example, in some embodiments, the optimization module 110, at element 610, applies one or more quantitative models to generate performance-based metrics indicating how the items 160 remaining in the selection set are projected to perform over a specified future period (e.g., 3 months, 6 months, 12 months, etc.). In various embodiments, the one or more quantitative models may include a multi-factor regression model that analyzes various factors believed to drive the performance of the items 160. In various embodiments, the regression model performs multiple regressions to analyze various factors associated with the remaining items 160 to determine an estimated value for the items 160, which helps determine which items 160 are expected to out-perform during a specified time period. In various embodiments, the optimization module 110, at element 610, filters out those items 160 that do not meet certain performance thresholds (e.g., based on the collections' 104 targets 107) for the various performance-based metrics.

Thus, in various embodiments, the disclosed filtering performed by the optimization module 110 in elements 608-610 narrows the selection set down significantly to determine a reduced universe of items 160 to potentially select. For example, in some instances, optimization module 110 may receive information corresponding to 50,000 different types of available items 160 at element 604 and, through elements 606-608, filter that list down significantly to, for example, 1,000 different types of available items 160. As noted above, reducing the size of the subset of items 160 under consideration prior to performing various elements of the multi-level optimization operation (e.g., portions that are computationally expensive, such as the cluster-level optimization calculations) may dramatically improve the speed with which the disclosed optimization techniques may be performed.

At element 612, in the illustrated embodiment, the optimization module 110 performs a collection-level optimization operation. For example, as discussed above with reference to FIG. 1, in various embodiments the optimization module 110 includes a collection-level optimization module 112 operable to perform a collection-level optimization operation for individual collections 104 in a cluster 140. For example, in various embodiments, the optimization module 110 may determine, for each collection 104 in the cluster 140 being optimized, which items 160 in the reduced selection set (that is, the items 160 still remaining for consideration after the filtering operations described above) it would be optimal to select (either for removal, during an item-removal phase, or addition, during an item-addition phase) for each of the collections 104 in the cluster 140 being optimized.

In the embodiment of FIG. 1, for instance, while optimizing cluster 140A, the collection-level optimization module 112 may perform a collection-level optimization calculation for each of the collections 104A-104E to identify, for each of the collections 104A-104E, a reduced set of items 160 that could, potentially, be selected. In various embodiments, the collection-level optimization operation includes performing an optimization calculation to maximize an objective function 116A. As one non-limiting example, in some embodiments the objective function 116A is provided as follows:

$$f(x) = \Sigma_{i=1}^{n} \text{ItemScore}(i) * \text{ChangeWeight}(i) \quad (1)$$

where, for a given type of item i being evaluated, ItemScore(i) incorporates one or more performance metrics associated with the given type of item 160, ChangeWeight(i) (also referred to herein as a "modification weight value") indicates the extent to which the number of the given type of item 160 is to be increased or decreased for the cluster 140 of collections 104, and where n is the number of different types of items 160 being considered in the optimization calculation. Note that, in various embodiments, solving the objective function 116A shown in Equation 1 is a convex optimization problem since the ItemScore(i) term is a scalar value (which does not make the problem non-convex) and the ChangeWeight(i) term includes values from a convex set. Further note that Equation 1 is provided merely as one non-limiting example of an objective function 116 that may be utilized during a collection-level optimization operation and, in other embodiments, various modifications may be made to this objective function as desired.

In various embodiments, the collection-level optimization calculation includes iteratively determining optimal Change Weight values so as to maximize the value of the objective function shown in Equation 1. In various embodiments, Change Weight is a vector (or other data structure suitable to represent a series of data values) where the indices of the vector correspond to the various types of items 160 still under consideration. In some such embodiments, a positive value at a given index indicates the amount (e.g., specified as a percentage, an integer number, a floating-point number, or in any other suitable manner) of that particular type of item 160 to select for the cluster 140. Similarly, in some such embodiments, a negative value at a given index of the Change Weight vector indicates the amount of that particular type of item 160 to remove from the collections 104 in the cluster 140. Further, in some such embodiments, a value of 0 at a given index of the Change Weight vector indicates that none of that particular type of item 160 are to be added to, or removed from, the collections 104 in the cluster 140. Note that, in various embodiments, the Change Weight vector will include only non-negative values (that is, positive values or 0) during an item-addition phase of the disclosed optimization techniques and will only include non-positive values (that is, negative value or 0) during the item-removal phase.

As one non-limiting example, if, for a given collection 104, the collection-level optimization operation evaluates 500 different types of items 160, the output of the collection-level optimization calculation may be a vector with 500 entries (e.g., a 1×500 matrix), with one entry corresponding to each of the 500 different types of items 160 under evaluation. As a non-limiting example, consider an embodiment in which there are 1000 different types of items 160 being evaluated for a particular collection 104A in the collection-level optimization calculation. In such an embodiment, the objective function $f(x)$ may include a term of ItemScore(1)*ChangeWeight(1) for i=1, ..., 1000, where each of the terms corresponds to a different type of item 160. In this non-limiting example, assume that the first term of the objective function $f(x)$ corresponds to a first type of item 160A and that, by maximizing the objective function 116, the optimization module 110 determines that the Change Weight value corresponding to item 160A is 0.50, which (in this non-limiting example) indicates that the number of instances of item 160A are to be increased by 50% for collection 104A.

Note that, in various embodiments, the collection-level optimization operation performed at element 612 does not incorporate selection-size constraints, which would convert this problem in to a non-convex problem. Instead, at element 612 in the illustrated embodiment, the optimization module 110 identifies, for each collection 104 in the cluster 140, which items 160 it would be desirable to select for inclusion in the collection 104 without regard to the selection-size constraints. In various embodiments, the optimization module 110 may make this determination based on the constraints associated with the collections 104, the collection 104's existing holdings 105, performance-based metrics generated (e.g., using the multi-factor regression model) for the items 160 still under consideration, or any combination thereof. Stated differently, in various embodiments at element 612, the optimization module 110 may identify those items 160, in the reduced subset of items, that the optimization module 110 would recommend selecting if each collection 104 in the cluster 140 were being optimized individually. Note that, in some embodiments, the collection-level optimization operation may take into consideration the minimum size constraint discussed above such that the solution for a given collection 104 will not include modifications less than this minimum size constraint.

In various embodiments, performing element 612 may enable the optimization module 110 to verify that optimization of a given collection 104 in the cluster 140 is feasible (based on that collection 106's constraints) before proceeding with cluster-level optimization operations for that collection 104 with the rest of the cluster 140. In this way, element 612 may be considered a "checkpoint" to determine whether a given collection 104 is removed from the cluster 140 (potentially to be optimized at a later time or with a different cluster 140 of collections 104).

In some embodiments, the collection-level optimization operation of element 612, in the depicted embodiment, attempts to identify a particular number (e.g., approximately 100, 250, 1,000, etc.) different types of items 160 for each of the collections 104 in the cluster 140 under optimization. In various embodiments, for a given collection 104, the corresponding items 160 include those that could potentially be selected for the given collection 104, were that collection 104 being optimized in isolation. Note that, in various embodiments, the particular types of items 160 selected at element 612 for a given collection 104 may or may not overlap with the types of items 160 selected for another collection 104 in the cluster 140. That is, while each of the collections 104 may initially start with the same set of approximately 1,000 types of items 160 available to them, the optimization module 110, at element 612, may then select those items 160 that are appropriate for each respective collection 104. As explained in detail below, the number of items 160 is further reduced in the subsequent steps of method 600, for example to improve computational performance of the optimization system 150.

Note that, in various embodiments, the disclosed techniques may include limiting the amount that can be allocated to any given type of item 160. For example, if the objective is to select 100 different types of items 160, the disclosed techniques may start by only allowing a 1% limit on each type of item 160. If it is determined that more than 100 types of items 160 are identified, then the percentage allocated to one position may be increased. If it is determined that fewer than 100 types of items 160 are suggested, then the percentage allowed to be allocated to one position may be decreased. This process may be performed until the desired amount is reached, according to some embodiments.

As shown in FIG. 6B, in various embodiments method 600 includes repeating the collection-level optimization operation at element 612. For example, in some embodiments, element 612 may be repeated multiple times (e.g., up to seven times or more) for each (or some subset of) the collections 104 in a cluster 140 so that, for each of the collections 104, the optimization module 110 may determine multiple lists of candidate items 160 that can be selected for the collections 104. For example, consider collection 104A in cluster 140A. In some embodiments, method 600 may include performing the collection-level optimization operation of element 612 seven different times, each time removing from consideration those type of items 160 selected during the previous "rounds." In this non-limiting example, this process may generate seven lists of candidate items 160 for the collection 104A, where the lists may be ranked by importance based on the round in which they were selected for the collection 104A (with a higher rank being given to items 160 identified during earlier rounds). In various embodiments, this collection-level optimization operation may be repeated until a particular number (e.g., 80, 100, etc.) different types of items have been identified for each collection 104 in the cluster 140. In various embodiments, these sets of ranked lists of candidate items 160 may be considered "fallback positions" for the collection 104A so that, if a particular type of item 160 selected for the collection 104A is instead taken by another collection 104B in the same cluster 140A, the optimization module 110 still has additional candidate items 160 for the collection 104A.

Further note that, in various embodiments, after completing the collection-level optimization operation for each of the collections 104 in the cluster 140, there may be some (and possibly many) types of items 160 in the reduced selection set that are not selected for any of the collections 104 in the cluster 140. Accordingly, at 614, in the illustrated embodiment, the optimization module 110 filters the items 160 based on the result of the collection-level optimization operation, further reducing the size of the selection set for the cluster 140 of collections 104 being optimized. In various embodiments, element 614 may be beneficial because it further reduces the size of the remaining items 160 down to those that would be desirable to select for the collections 104 under optimization. For example, if, before element 612, the reduced selection set included 1,000 different types of items 160 for each collection 104 in the cluster 140, after optimization module 110 performs element 612 there may be, for instance, approximately 100 remaining types of items 160 for each collection 104 in the cluster 140. In some embodiments, element 614 may include filtering the items 160 in the selection set based on the ranked lists mentioned above. For example, in an instance in which there are still a large number of types of items 160 under consideration, element 614 may include removing, from further consideration, those types of items 160 that are present only on low-ranked lists. In this way, various embodiments include retaining those types of items 160 identified during earlier rounds of the collection-level optimization operation.

At 616, in the illustrated embodiment, the optimization module 110 performs a first cluster-level optimization operation. For example, as discussed above with reference to FIG. 1, in various embodiments the optimization module 110 includes a cluster-level optimization module 114 operable to perform one or more cluster-level optimization operations for the cluster 140 of collections 104 being optimized. In the embodiment depicted in FIGS. 6A-6B, for example, method 600 includes performing two cluster-level optimization operations: a first cluster-level optimization operation (involving a convex optimization problem) at element 616 that does not take into consideration selection-size constraints 118, and a second cluster-level optimization operation (involving a non-convex optimization problem) at element 620 that does incorporate selection-size constraints 118 when performing the optimization calculation. That is, in FIG. 6B, the first cluster-level optimization operation uses the reduced selection set of available items 160 (based on the output of the collection-level optimization operation of element 612) and does not take into consideration, when performing the cluster-level optimization calculation, the selection-size constraints that would limit the optimization system 150's ability to select items 160. For example, there are some embodiments in which particular types of items 160 have a selection-size constraint 118 providing that the items 160 of that particular type must be selected in specified block sizes (e.g., in blocks of 5,000 items 160). For example, if Entity A has 10,000 of a particular type of item 160A but Entity B only wishes to select 5,000 of that particular type of item 160A, Entity B would typically be unable to obtain fewer than the entire 10,000 items 160A. In various embodiments, however this first collection-level optimization operation ignores these selection-size constraints 118 and instead simply identifies those items 160, and the quantities of those items 160, that would be most advantageous to select for the cluster 140, taking into consideration the cluster 140's ability to select items 160 together, which allows those items 160 that were selected numerous times in these optimizations operations to be identified.

In various embodiments, performing this first cluster-level optimization operation without taking into consideration the selection-size constraints 118 may provide various technical benefits. For example, taking the selection-size constraints 118 into consideration converts it into a non-convex problem, making the optimization problem significantly more complex and, as such, more computationally expensive. By relaxing these rounding requirements, various embodiments reduce the computational requirements of this first cluster-level optimization operation, allowing it to be performed quickly (e.g., within seconds) to verify, before proceeding further in method 600, that there is actually a solution to the optimization problem for the collections 104 in the cluster 140 and the items 160 currently available in the selection set.

In various embodiments, the first cluster-level optimization operation includes performing an optimization calculation based on the objective function 116A. In some embodiments, the first cluster-level optimization calculation includes maximizing the objective function 116A shown above in Equation 1, taking into consideration all of the collections 104 in the cluster 140. For example, in various embodiments the first cluster-level optimization calculation includes iteratively determining optimal Change Weight values so as to maximize the value of the objective function. In various embodiments Change Weight is a vector (or other data structure suitable to represent a series of data values) where the indices of the vector correspond to the various types of items 160 still under consideration and the data values at a given index indicate the change to make, for a given collection 104 in the cluster 140, with regard to the corresponding type of item 160. For example, in some embodiments the Change Weight vector may include different portions indicating the selections to make for the different collections 104 in the cluster 140. For example, if there are five different types of items 160A-160E under consideration for collection 104A and six different types of items 160A-160F under consideration for collection 104B, the Change Weight vector may include five data values indicating the additions or removals to make, for items 160A-160E, for collection 104A, and six data values indicating the additions or removals to make, for items 160A-160F, for collection 104B.

In various embodiments, by optimizing across a cluster 140 of collections 104, the disclosed techniques are capable of aggregating the total number of items 160 added or removed at the item level, not just at the collection level. For example, if two collections 104A and 104B each have 5,000 instances of item 160A and there is a different penalty associated with removing 5,000 instances of item 160A and removing 10,000 instances of item 160A, the optimization system 150 is able to select between realizing the penalty associated with removing 5,000 instances of item 160A from each collection 104A-104B, or aggregate across collections 104A and 104B so as to realize the penalty associated with removing 10,000 instances of item 160A as one block. Thus, in various embodiments, the optimization system 150 attempts to maximize the overall score across all types of items 160 across all collections 104 in the cluster 140 while minimizing the penalties associated with making these modifications. This, in turn, allows the selection-penalty term to be incorporated so that the optimization system 150 can quantify whether it is advantageous to remove smaller or larger numbers of instances of an item 160, across one or multiple collections 104.

At element 618, in the depicted embodiment, the optimization module 110 filters the items 160 based on the result of the first cluster-level optimization operation performed at element 616. For example, in some embodiments, after element 612, the optimization module 110 has determined which types of items 160 would be selected for each collection 104 in the cluster 140 if optimized individually and, after element 616, the optimization module 110 has determined which types of items 160 would be selected for the cluster 140 of collections 104 when selection-size constraints 118 are not taking into consideration. In various embodiments, it may be desirable to, again, further reduce the size of the selection set of available items 160 still under consideration for each collection 104 in the cluster 140 under optimization. As a non-limiting example, in some embodiments, the optimization module 110 may reduce the size of the remaining selection set from approximately 100 different types of items 160 to approximately 60 different types of items 160 for each collection 104. In some embodiments, further reducing the number of items 160 still under consideration at element 618 may reduce the computational complexity of the subsequent optimization operations yet to be performed in method 600 (described below), thereby increasing the speed with which these optimization operations may be performed without materially affecting the outcome of the optimization process itself. For example, as will be appreciated by one of skill in the art with the benefit of this disclosure, reducing the size of the selection set for each collection 104 from approximately 100 different types of items 160 to approximately 60 different types of items 160 may result in an exponential reduction in computational complexity for the second cluster-level optimization operation at element 620 (below) due to the matrix operations performed during the optimization calculation.

Accordingly, at 618, in the illustrated embodiment, the optimization module 110 may further reduce the size of the selection set for each collection 104 in the cluster 140. For example, in some embodiments, for a given collection 104 under optimization, the optimization module 110 may retain, in the selection set for that collection 104, those items 160 that are most likely going to be selected for that collection 104 (e.g., based on the results of elements 612 and 616). Note that, in various embodiments, there may be items 160 in the remaining selection set that are not selected for recommendation during this first cluster-level optimization operation. In many instances, if a particular type of item 160 is not selected in numerous optimizations without the selection-size constraints 118, it is very unlikely that it will be selected with the selection-size constraints 118 such that these items 160 may be excluded from the selection set. Additionally, at element 618, the optimization module 110 may retain additional items 160 that could potentially be selected for the collections 104 based on any desired criteria, such as one or more performance metrics. As a non-limiting embodiment, the optimization module 110 may keep the selection set for a given collection 104 at approximately 60 different types of items 160 at element 618 so as to provide flexibility during the second cluster-level optimization operation, discussed below.

At 620, in the illustrated embodiment, the optimization module 110 performs a second cluster-level optimization operation. For example, as discussed above with reference to FIG. 1, in various embodiments the cluster-level optimization module 114 of optimization module 110 is operable to perform a cluster-level optimization calculation for the cluster 140 of collections 104 being optimized using the objective function 116B. In various embodiments, element 620 may be performed in a manner similar to the first cluster-level optimization operation described above with reference to element 616 in that the second cluster-level optimization calculation may include iteratively determining optimal Change Weight values so as to maximize the value of an objective function 116. As indicated in FIG. 6B, however, this second cluster-level optimization operation, in the depicted embodiment, uses the reduced selection set (e.g., from element 618) and does take into consideration the selection-size constraints 118 that limit the optimization system 150's ability to select items 160. Stated differently, the second cluster-level optimization operation, in various embodiments, may identify an optimal number of each type of item 160 to select, taking into consideration both the selection-size constraints 118 of the various types of items 160 and the cluster 140's ability to select items 160 together. As one non-limiting example, in some embodiments the objective function 116B utilized during the second cluster-level optimization operation is provided as follows:

$$f(x)=\Sigma_{i=1}^{n}((\text{ItemScore}(i)*\text{ChangeWeight}(i))-(\text{ModificationPenalty}(i)*\text{TotalChangeWeight}(i))) \quad (2)$$

In various embodiments, the objective function 116B utilized during the second cluster-level optimization operation takes into consideration the selection-size constraints 118, limiting the number of a particular type of item 160 that may be added to or removed from a collection 104 based on the corresponding selection-size constraint 118. As noted above, in various embodiments the inclusion of these selection-size constraints 118 converts the optimization problem into a non-convex problem. More specifically, the ItemScore is still a scalar which is convex. Change Weight, however, is non-convex since it takes into consideration the integer selection-size constraint 118. As a non-limiting example, consider an instance in which the selection-size constraint 118 dictates that all types of items 160 must be added in multiples of 5000. In this non-limiting example, 5000 and 10,000 would both be in the set of feasible solutions, but 7500 (a point that lies between 5000 and 10,000) is not.

Further, the objective function 116B shown in Equation 2 includes a second term that multiplies the modification penalty associated with a given type of item 160 by the total change weight (that is, the aggregated amount of change) for that type of item 160 across all collections 104 in the cluster 140. As discussed above, in various embodiments there is a variable modification penalty that depends on the number of a particular type of item 160 added or removed from the collections. In various embodiments, the value of the modification-penalty term may vary depending on the number of a particular type of item 160 that is being removed from (or, in some embodiments, added to) a collection 104. For example, in some embodiments, the selection-penalty term may be assigned one of a set number (e.g., 3, 5, 10, etc.) of values (e.g., 10, 15, 20, etc.) depending on the number of items 160 of a particular type being removed from a collection. In some embodiments, the value of the selection-penalty term may decrease as the number of a particular type of item 160 are removed from (or, in some embodiments, added to) a collection 104. Accordingly, in some such embodiments, there is a higher modification-penalty associated with removing a smaller number of a particular type of item 160 than removing a larger number of that particular type of item 160 from a collection 104. Accordingly, due to the inclusion of the selection-size constraints 118 and the modification penalties into the objective function 116B, this problem is non-convex. However, since the size of the problem has been significantly reduced through the series of filters and convex problems, as described above, this non-convex problem may be performed in a fast and computationally efficient manner is much more it is now feasible to solve.

In various embodiments, at element 620, the optimization module 110 may perform the second cluster-level optimization operation by applying these constraints (temporarily ignored in elements 612 and 616). Because the selection size of remaining items 160 available for selection has been reduced in size, however, the optimization module 110 may perform this second cluster-level optimization operation in a time- and computationally efficient manner, even taking these selection-size constraints 118 into consideration, according to some embodiments.

Applicant recognizes that, if all of these selection-size constraints 118 were applied with all of the available items 160, finding even a feasible solution (let alone an "optimal" solution) would take a significant amount of computing time (e.g., days). Accordingly, in various embodiments, the disclosed techniques perform collection-level optimization (e.g., at element 612) and the first cluster-level optimization (e.g., element 616) with relaxed selection-size constraints 118 in order to first obtain insight as to which items 160 may be desirable for each collection 104 in the cluster 140 under optimization, while doing so within a short time period (e.g., seconds). This, in turn, allows the optimization module 110 to run the second cluster-level optimization at element 620 and find a feasible optimization solution within the desired time limitations (e.g., seconds or minutes).

In various embodiments, performing the disclosed optimization calculations (e.g., the collection-level optimization calculations at element 612, the first cluster-level optimization calculation at element 616, the second cluster-level optimization calculation at element 620) may include using one or more of various suitable optimization algorithms (e.g., a convex optimization algorithm). For example, in various embodiments, the optimization module 110 may apply an optimization algorithm to maximize an objective function (described above). As one non-limiting example, in some embodiments, the disclosed techniques may utilize solvers that use the CVXPY Python-embedded modeling language (such as the CBC or MOSEK solvers) to perform one or more of the disclosed optimization calculations to determine optimal values for the Change Weight values described above. Note, however, that this embodiment is included merely as one non-limiting example and, in other embodiments, various other suitable software libraries or tools may be used as desired.

In various embodiments, the second cluster-level optimization operation determine an output value 170 indicating modifications that could actually be performed based on the current availability of the items 160. At 622, in the illustrated embodiment, the optimization system 150 determines the modifications to be made to the composition of the collections 104 in the cluster 140 based on the second cluster-level optimization operation of element 620. For example, in various embodiments, the optimization system 150 may determine the modifications to be made to the collections 104 based on the output value 170 generated during the second cluster-level optimization operation. Note that, in various embodiments, each of the collections 104 in the cluster 140 under optimization has its own list of modifications to be made, and that each collection 104 is not required to make the same modifications as the rest of the collections 104 in the cluster 140. In this way, the modifications made to a given collection 104 are tailored to that collection 104, according to various embodiments. In various embodiments, at element 622, the optimization system 150 generates information indicative of the determined modifications, where this information may specify the types of items 160 to be selected, the quantities of each different type of item 160 to select, and the manner in which the different items 160 are to be partitioned among the collections 104 in the cluster 140.

At 624, in the illustrated embodiment, the optimization module 110 generates output information indicating the determined modifications for the collections 104 in the cluster 140 under optimization. For example, in some embodiments, the optimization module 110 may store output information (e.g., as a comma-separated value ("CSV") file or in any other suitable format) in a shared drive, where it may then be accessed by the modification execution system 206 of FIG. 2. In some embodiments, the output information may be generated based on the output value 170 described above, e.g., by converting the information contained in the output value 170 into a format that is compatible with the modification execution system 206. In other embodiments, however, the output information may simply be the output value 170 described above. Note that, in various embodiments, the techniques disclosed herein may be used to perform optimization in the context described in detail in U.S. Provisional Patent Applications 63/072,829 and 63/111,056, both of which are incorporated by reference as if entirely set forth herein.

Example Computer System

Figure 7:
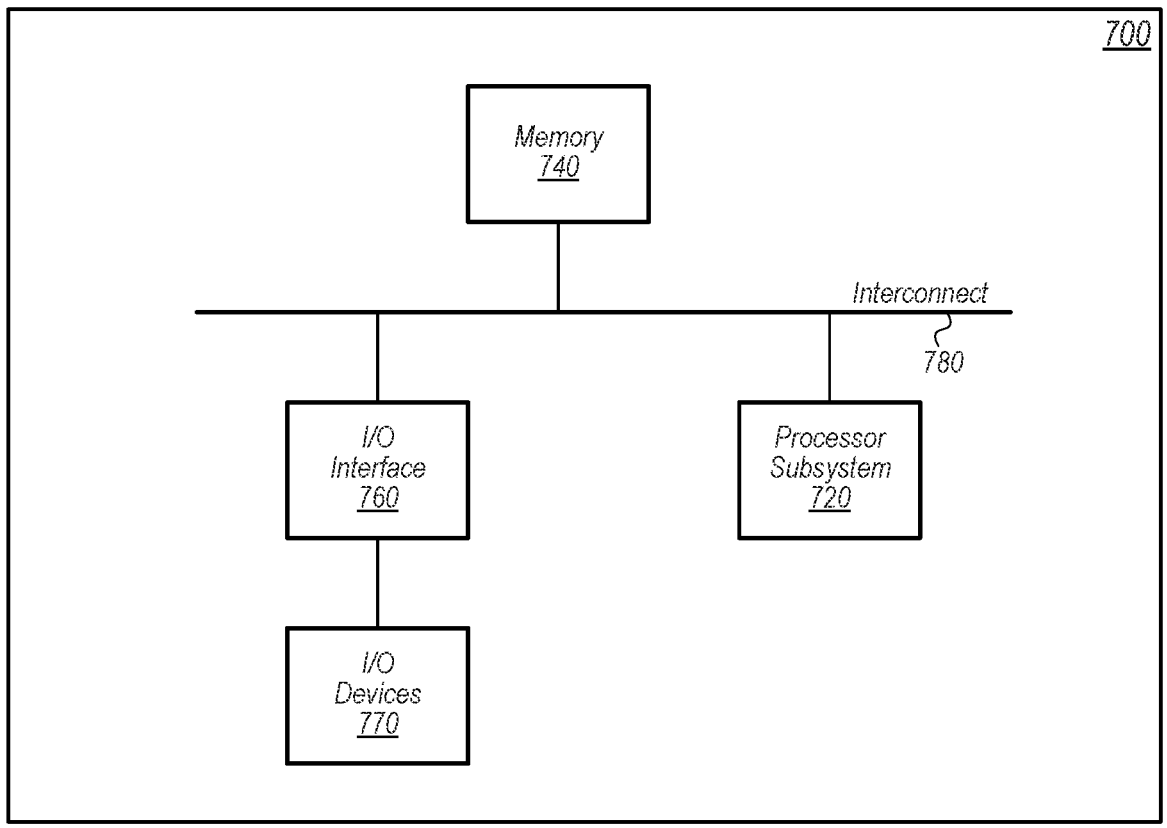
FIG. 7 is a block diagram illustrating an example computer system, according to some embodiments.

Referring now to FIG. 7, a block diagram of an example computer system 700 is depicted, which may implement one or more computer systems, such as optimization system 150 of FIG. 1, according to various embodiments. Computer system 700 includes a processor subsystem 720 that is coupled to a system memory 740 and I/O interfaces(s) 760 via an interconnect 780 (e.g., a system bus). I/O interface(s) 760 is coupled to one or more I/O devices 770. Computer system 700 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 700 is shown in FIG. 7 for convenience, computer system 700 may also be implemented as two or more computer systems operating together.

Processor subsystem 720 may include one or more processors or processing units. In various embodiments of computer system 700, multiple instances of processor subsystem 720 may be coupled to interconnect 780. In various embodiments, processor subsystem 720 (or each processor unit within 720) may contain a cache or other form of on-board memory.

System memory 740 is usable to store program instructions executable by processor subsystem 720 to cause system 700 perform various operations described herein. System memory 740 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 700 is not limited to primary storage such as system memory 740. Rather, computer system 700 may also include other forms of storage such as cache memory in processor subsystem 720 and secondary storage on I/O devices 770 (e.g., a hard drive, storage array, etc.). In some embodiments, these other forms of storage may also store program instructions executable by processor subsystem 720.

I/O interfaces 760 may be any of various types of interfaces configured to couple to and communicate with other devices, according to various embodiments. In one embodiment, I/O interface 760 is a bridge chip (e.g., Southbridge) from a front-side to one or more back-side buses. I/O interfaces 760 may be coupled to one or more I/O devices 770 via one or more corresponding buses or other interfaces. Examples of I/O devices 770 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 770 includes a network interface device (e.g., configured to communicate over WiFi, Bluetooth, Ethernet, etc.), and computer system 700 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

"In this disclosure, various "modules" operable to perform designated functions are shown in the figures and described in detail (e.g., optimization module 110, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa."

What is claimed is:

1. A method, comprising:
retrieving, by a computer system from an item-availability database, availability data corresponding to a plurality of items that are currently available for selection;
identifying, by the computer system from a plurality of collections, a first cluster of collections to optimize as a group; and
performing, by the computer system, a multi-level optimization operation to optimize a composition of the first cluster of collections, wherein the multi-level optimization operation includes:
performing a collection-level optimization calculation for individual ones of the first cluster of collections, wherein, for a given collection in the first cluster of collections, the collection-level optimization calculation includes maximizing a first version of an objective function to determine a first set of modification weight values corresponding to respective ones of the plurality of items;
based on the first set of modification weight values, identifying a reduced subset of the plurality of items, wherein the reduced subset of items excludes one or more of the plurality of items;
performing a cluster-level optimization calculation for the first cluster of collections, wherein the cluster-level optimization calculation includes maximizing a second version of the objective function to identify a second set of modification weight values corresponding to respective ones of the reduced subset of items, wherein the cluster-level optimization calculation is performed based on one or more selection-size constraints for the reduced subset of items;
based on the second set of modification weight values, identifying a final subset of the plurality of items to use to optimize the composition of the first cluster of collections; and
generating an output value that indicates a set of modifications to perform, for the final subset of items, to optimize the composition of the first cluster of collections.

2. The method of claim 1, wherein the cluster-level optimization calculation further includes:
   performing an initial cluster-level optimization calculation for the first cluster of collections to identify, from the reduced subset of items, a second, smaller subset of items, wherein the initial cluster-level optimization calculation does not include the one or more selection-size constraints; and
   based on the second, smaller subset of items, performing a subsequent cluster-level optimization calculation for the first cluster of collections to identify, from the second, smaller subset of items, the final subset of items, wherein the subsequent cluster-level optimization calculation is based on the one or more selection-size constraints that a number of a given type of item that may be selected for the first cluster of collections.

3. The method of claim 1, wherein the identifying the first cluster of collections to optimize as a group includes iteratively classifying individual ones of the plurality of collections into one of a set of classifications, wherein, for a particular one of the plurality of collections, the iteratively classifying includes:
   accessing collection information corresponding to the particular collection, wherein the collection information specifies one or more performance targets for the particular collection;
   comparing the particular collection to an ordered set of classification criteria; and
   based on the comparing, determining a particular classification for the particular collection.

4. The method of claim 3, wherein the identifying the first cluster of collections to optimize as a group further includes quantifying a similarity between collections within the particular classification, including by:
   determining similarity scores for pairs of collections in the particular classification;
   generating a matrix of the similarity scores for the pairs of the collections in the particular classification; and
   based on the matrix, determining a plurality of clusters of collections in the particular classification.

5. The method of claim 4, wherein the determining the plurality of clusters of collections in the particular classification is performed using a k-means clustering algorithm;
   wherein the plurality of clusters of collections in the particular classification includes a second cluster of collections; and
   wherein the method further comprises:
      determining a selection priority between the first cluster of collections and the second cluster of collections based on respective classifications for the first and second clusters; and
      based on the selection priority, performing, by the computer system, the multi-level optimization operation for the first cluster of collections before the second cluster of collections.

6. The method of claim 1, wherein the multi-level optimization operation further includes:
   filtering the plurality of items to identify a first subset of items that satisfy user-specific constraints associated with the collections included in the first cluster of collections.

7. The method of claim 6, wherein the multi-level optimization operation further includes:
   generating, by the computer system, one or more performance-based metrics for individual ones of the first subset of items; and
   filtering the first subset of items based on the one or more performance-based metrics to identify a second subset of items, wherein the second subset of items is smaller than the first subset of items, and wherein the collection-level optimization calculation is performed to identify the reduced subset of items from the second subset of items.

8. The method of claim 7, wherein the generating the one or more performance-based metrics includes applying a multi-factor regression model to attributes associated with items in the first subset of items to generate the one or more performance-based metrics.

9. The method of claim 1, wherein the output value that indicates the set of modifications is a vector in which a data value at a given index of the vector indicates a particular modification to be made for a corresponding one of the final subset of items; and wherein the objective function includes a penalty term that applies a penalty based on a number of a given type of item being removed from one or more of the collections in the first cluster.

10. A non-transitory, computer-readable medium having instructions stored thereon that are executable by a computer system to perform operations comprising:
    retrieving, from an item-availability database, availability data corresponding to a plurality of items that are currently available for selection;
    identifying, from a plurality of collections, a first cluster of collections to optimize as a group; and
    performing a multi-level optimization operation to optimize a composition of the first cluster of collections, wherein the multi-level optimization operation includes:
       performing a collection-level optimization calculation for individual ones of the first cluster of collections, wherein, for a given collection in the first cluster of collections, the collection-level optimization calculation includes maximizing a first version of an objective function to determine a first set of modification weight values corresponding to respective ones of the plurality of items;
       based on the first set of modification weight values, identifying a reduced subset of the plurality of items, wherein the reduced subset of items excludes one or more of the plurality of items;
       performing a cluster-level optimization calculation for the first cluster of collections, wherein the cluster-level optimization calculation includes maximizing a second version of the objective function to identify a second set of modification weight values corresponding to respective ones of the reduced subset of items, wherein the cluster-level optimization calculation is performed based on one or more selection-size constraints for the reduced subset of items;
       based on the second set of modification weight values, identifying a final subset of the plurality of items to use to optimize the composition of the first cluster of collections; and
       generating an output value that indicates a set of modifications to perform, for the final subset of items, to optimize the composition of the first cluster of collections.

11. The non-transitory, computer-readable medium of claim 10, wherein the cluster-level optimization calculation further includes:
    performing an initial cluster-level optimization calculation for the first cluster of collections to identify, from the reduced subset of items, a second, smaller subset of items, wherein the initial cluster-level optimization calculation does not include the one or more selection-size constraints; and based on the second, smaller subset of items, performing a subsequent cluster-level optimization calculation for the first cluster of collections to identify, from the second, smaller subset of items, the final subset of items, wherein the subsequent cluster-level optimization calculation is based on the one or more selection-size constraints that a number of a given type of item that may be selected for the first cluster of collections.

12. The non-transitory, computer-readable medium of claim 10, wherein the identifying the first cluster of collections to optimize as a group includes iteratively classifying individual ones of the plurality of collections into one of a set of classifications, wherein, for a particular one of the plurality of collections, the iteratively classifying includes:

accessing collection information corresponding to the particular collection, wherein the collection information specifies one or more performance targets for the particular collection;

comparing the particular collection to an ordered set of classification criteria; and based on the comparing, determining a particular classification for the particular collection.

13. The non-transitory, computer-readable medium of claim 12, wherein the identifying the first cluster of collections to optimize as a group further includes quantifying a similarity between collections within the particular classification, including by:

determining similarity scores for pairs of collections in the particular classification;

generating a matrix of the similarity scores for the pairs of the collections in the particular classification; and based on the matrix, determining a plurality of clusters of collections in the particular classification.

14. The non-transitory, computer-readable medium of claim 13, wherein the determining the plurality of clusters of collections in the particular classification is performed using a k-means clustering algorithm;

wherein the plurality of clusters of collections in the particular classification includes a second cluster of collections; and wherein the operations further comprise:

determining a selection priority between the first cluster of collections and the second cluster of collections based on respective classifications for the first and second clusters; and based on the selection priority, performing, by the computer system, the multi-level optimization operation for the first cluster of collections before the second cluster of collections.

15. The non-transitory, computer-readable medium of claim 10, wherein the multi-level optimization operation further includes:

filtering the plurality of items to identify a first subset of items that satisfy user-specific constraints associated with the collections included in the first cluster of collections.

16. A system, comprising:

at least one processor;

a non-transitory, computer-readable medium having instructions stored thereon that are executable by the at least one processor to cause the system to:

retrieve, from an item-availability database, availability data corresponding to a plurality of items that are currently available for selection;

identify, from a plurality of collections, a first cluster of collections to optimize as a group; and perform a multi-level optimization operation to optimize a composition of the first cluster of collections, wherein the multi-level optimization operation includes:

performing a collection-level optimization calculation for individual ones of the first cluster of collections, wherein, for a given collection in the first cluster of collections, the collection-level optimization calculation includes maximizing a first version of an objective function to determine a first set of modification weight values corresponding to respective ones of the plurality of items;

based on the first set of modification weight values, identifying a reduced subset of the plurality of items, wherein the reduced subset of items excludes one or more of the plurality of items;

performing a cluster-level optimization calculation for the first cluster of collections, wherein the cluster-level optimization calculation includes maximizing a second version of the objective function to identify a second set of modification weight values corresponding to respective ones of the reduced subset of items, wherein the cluster-level optimization calculation is performed based on one or more selection-size constraints for the reduced subset of items;

based on the second set of modification weight values, identifying a final subset of the plurality of items to use to optimize the composition of the first cluster of collections; and generating an output value that indicates a set of modifications to perform, for the final subset of items, to optimize the composition of the first cluster of collections.

17. The system of claim 16, wherein the cluster-level optimization calculation further includes:

performing an initial cluster-level optimization calculation for the first cluster of collections to identify, from the reduced subset of items, a second, smaller subset of items, wherein the initial cluster-level optimization calculation does not include the one or more selection-size constraints; and based on the second, smaller subset of items, performing a subsequent cluster-level optimization calculation for the first cluster of collections to identify, from the second, smaller subset of items, the final subset of items, wherein the subsequent cluster-level optimization calculation is based on the one or more selection-size constraints that a number of a given type of item that may be selected for the first cluster of collections.

18. The system of claim 16, wherein the identifying the first cluster of collections to optimize as a group includes iteratively classifying individual ones of the plurality of collections into one of a set of classifications, wherein, for a particular one of the plurality of collections, the iteratively classifying includes:

accessing collection information corresponding to the particular collection, wherein the collection information specifies one or more performance targets for the particular collection;

comparing the particular collection to an ordered set of classification criteria; and based on the comparing, determining a particular classification for the particular collection; and wherein the identifying the first cluster of collections to optimize as a group further includes quantifying a similarity between collections within the particular classification, including by:
  determining similarity scores for pairs of collections in the particular classification;
  generating a matrix of the similarity scores for the pairs of the collections in the particular classification; and
  based on the matrix, determining a plurality of clusters of collections in the particular classification.

19. The system of claim 16, wherein the multi-level optimization operation further includes:
  filtering the plurality of items to identify a first subset of items that satisfy user-specific constraints associated with the collections included in the first cluster of collections.

20. The system of claim 19, wherein the multi-level optimization operation further includes:
  generating one or more performance-based metrics for individual ones of the first subset of items; and
  filtering the first subset of items based on the one or more performance-based metrics to identify a second subset of items, wherein the second subset of items is smaller than the first subset of items, and wherein the collection-level optimization calculation is performed to identify the reduced subset of items from the second subset of items.

* * * * *